(12) United States Patent
Kubo et al.

(10) Patent No.: US 6,313,601 B1
(45) Date of Patent: Nov. 6, 2001

(54) SPEED CONTROL OF A MOTOR

(75) Inventors: Mitsumasa Kubo, Tachikawa; Masashi Tanaka, Iruma, both of (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/592,370

(22) Filed: Jun. 12, 2000

(30) Foreign Application Priority Data

Jun. 14, 1999 (JP) .................................................. 11-166421

(51) Int. Cl.[7] ...................................................... H02P 5/28
(52) U.S. Cl. .......................... 318/799; 318/603; 318/254; 318/138; 318/439; 388/809
(58) Field of Search ..................... 318/603, 254, 318/138, 439; 388/809; 360/74.4, 72.2, 73.03; 369/71

(56) References Cited

U.S. PATENT DOCUMENTS

| 5,371,635 | 12/1994 | Sakaguchi et al. | 360/73.03 |
| 5,471,451 | * 11/1995 | Masaki et al. | 318/603 |
| 5,717,537 | * 2/1998 | Watanabe et al. | 318/603 |

FOREIGN PATENT DOCUMENTS

03016066-A   1/1991   (JP) .

* cited by examiner

*Primary Examiner*—Karen Masih
(74) *Attorney, Agent, or Firm*—Woodcock Washburn Kurtz Mackiewicz & Norris LLP

(57) ABSTRACT

A three-phase motor having three Hall-effect devices for production of as many rotor position signals for use in excitation control of its windings, the signals being indicative of the angular position of the motor rotor with respect to the stator and having phase differences of 120 degrees. A motor speed control system is disclosed which utilizes the rotor position signals for detection of the actual running speed of the motor. Included are differentiating circuits connected one to each Hall-effect device for producing outputs in prescribed phase relationship with the rotor position signals. Connected to the differentiating circuits, switching transistors are controlled by binary switch control signals derived from the rotor position signals, passing the positive half-waves, or approximately positive half-waves, of the differentiating circuit outputs. The thus-obtained half-waves are then added together into a motor speed signal representative of the actual running speed of the motor. This signal is subsequently compared with a target speed signal indicative of a desired running speed of the motor, and the difference, if any, therebetween is fed as a speed control signal into a motor excitation circuit, which responds to both the rotor position signals and the speed control signal for exciting the motor windings for rotation at the desired speed.

60 Claims, 16 Drawing Sheets

SPEED CONTROL OF A MOTOR

BACKGROUND OF THE INVENTION

This invention relates generally to the speed control of electric motors, and specifically to improvements in a speed control system for motors, particularly those suitable for use in a disk drive, such for example as a CD-ROM drive, for moving the transducer or pickup assembly across the track turns of the rotating data storage disk, among other applications.

Brushless d.c. motors have found widespread use for rotating a data storage disk or for moving a transducer across the data tracks on the disk. Fine control of motor speed is an absolute requirement in such applications. U.S. Pat. No. 5,371,635 to Sakaguchi et al., assigned to the assignee of the instant application, is hereby cited as teaching a system for generating pulses indicative of the angular position and rotational speed of a data storage disk. This prior art system is unsatisfactory for its complexity and expensiveness of construction as an inevitable result of the use of a motor speed sensor aside from the control electronics.

Japanese Unexamined Patent Publication No. 3-16066 suggests, for speed control of a brushless d.c. motor, to utilize the Hall-effect devices, the magnetoelectric converters, that have been customarily built into this type of motor for detection of the angular position of its rotor relative to the stator. The rotor position signals produced by the magnetoelectric converters are differentiated and further processed into a motor speed signal indicative of the actual rotational speed of the motor preparatory to motor speed control.

This second prior art system gains a definite advantage over the first recited one in that it does without any dedicated motor speed sensor. It is still objectionable, however, first because the control electronics, particularly those for production of the motor speed signal from the rotor position signals supplied by the magnetoelectric converters, is not as simple and inexpensive as can be desired. Secondly, the motor speed signal so produced is inconveniently high in ripple percentage, running counter to the objective of fine motor speed control.

SUMMARY OF THE INVENTION

The present invention has it as an object, in producing the motor speed signal without use of a motor speed sensor as above, to minimize the ripple of the motor speed signal for controlling the motor speed with a minimum of errors.

Another object of the invention is, in speed control of a brushless d.c. motor without use of a motor speed sensor of any kind, to materially simplify the circuitry for production, from the rotor position signals supplied by the standard magnetoelectric converts, of a motor speed signal which indicates the actual rotational speed of the motor and which is needed for its speed control.

Briefly, the present invention may be summarized as a speed control system for a motor of the type having magnetoelectric converter means for providing a first, a second and a third rotor position signal with phase differences of 120 degrees therebetween, each rotor position signal being indicative of the angular position of a rotor relative to a stator. The motor speed control system comprises differentiating circuit means for differentiating the first, the second and the third rotor position signal and providing a first, a second and a third output signal in a prescribed phase relationship with the first, the second and the third rotor position signal, respectively. A first, a second and a third switch are provided for selectively passing the first, the second and the third output from the differentiating circuit means under the control of a first, a second and a third binary switch control signal, respectively. The first, the second and the third switch control signals are derived from the first, the second and the third rotor position signal in a prescribed phase relationship therewith. Outputs from the three switches are added together into a motor speed signal representative of the actual rotational speed of the motor. The motor speed signal is compared with a target speed signal representative of a desired rotational speed of the motor, thereby providing a motor speed control signal indicative of the difference between the actual and the desired motor speeds. A motor excitation circuit responds both to the first, the second and the third rotor position signal and to the speed control signal for causing the motor to rotate at the desired speed.

The invention is applicable to brushless d.c. motors, d.c. motors with brushes, and alternating current motors. The motor speed signal is obtained from the rotor position signals supplied from the Hall-effect devices or like magnetoelectric converters. For production of the motor speed signal from the rotor position signals, these signals must be differentiated, and parts of the resulting signals must be extracted, or the resulting signals put to what is essentially equivalent to half- or full-wave rectification, prior to being added together into the motor speed signal.

Such extraction or rectification is accomplished according to the invention as the first to third switches selectively pass the first to third outputs from the differentiating circuits under the control of the first to third binary switch control signals. The present invention particularly features the creation of the switch control signals by shaping the rotor position signals, which are in the form of sine waves, into binary signals. With the motor speed signal produced in this manner, the complete speed control system is greatly simplified in construction compared to the closest prior art set forth above.

According to another feature of the invention, the rotor position signals are 30 degrees delayed in phase before being turned into binary signals for switch control. Desired segments of the rotor position signals can be ideally extracted by controlling the switches by these binary switch control signals, resulting in the provision of a motor speed signal, or speed control signal, that is less in ripple percentage.

A further embodiment is disclosed which employs an operational amplifier in place of a simple adder for combining the outputs from the switches. The operational amplifier performs the dual function of differentiation and addition of the outputs from the switches, or even the multiple function of the differentiation and addition of the switch outputs and the comparison of the resulting motor speed signal with the target speed signal, thereby contributing to greater simplicity in circuit arrangement.

There is also disclosed herein a yet further embodiment that employs another set of switches which coact with the first recited set of switches for what is equivalent to full-wave rectification of the outputs from the differentiating circuit means. The resulting motor speed signal, or speed control signal, is still more reduced in ripple percentage.

The above and other objects, features and advantages of this invention and the manner of achieving them will become more apparent, and the invention itself will best be understood, from a study of the following description and attached claims, with reference had to the accompanying drawings showing the preferred embodiments of the invention.

DESCRIPTION OF THE PREFERRED EMBODIMENTS

General

Figure 1:
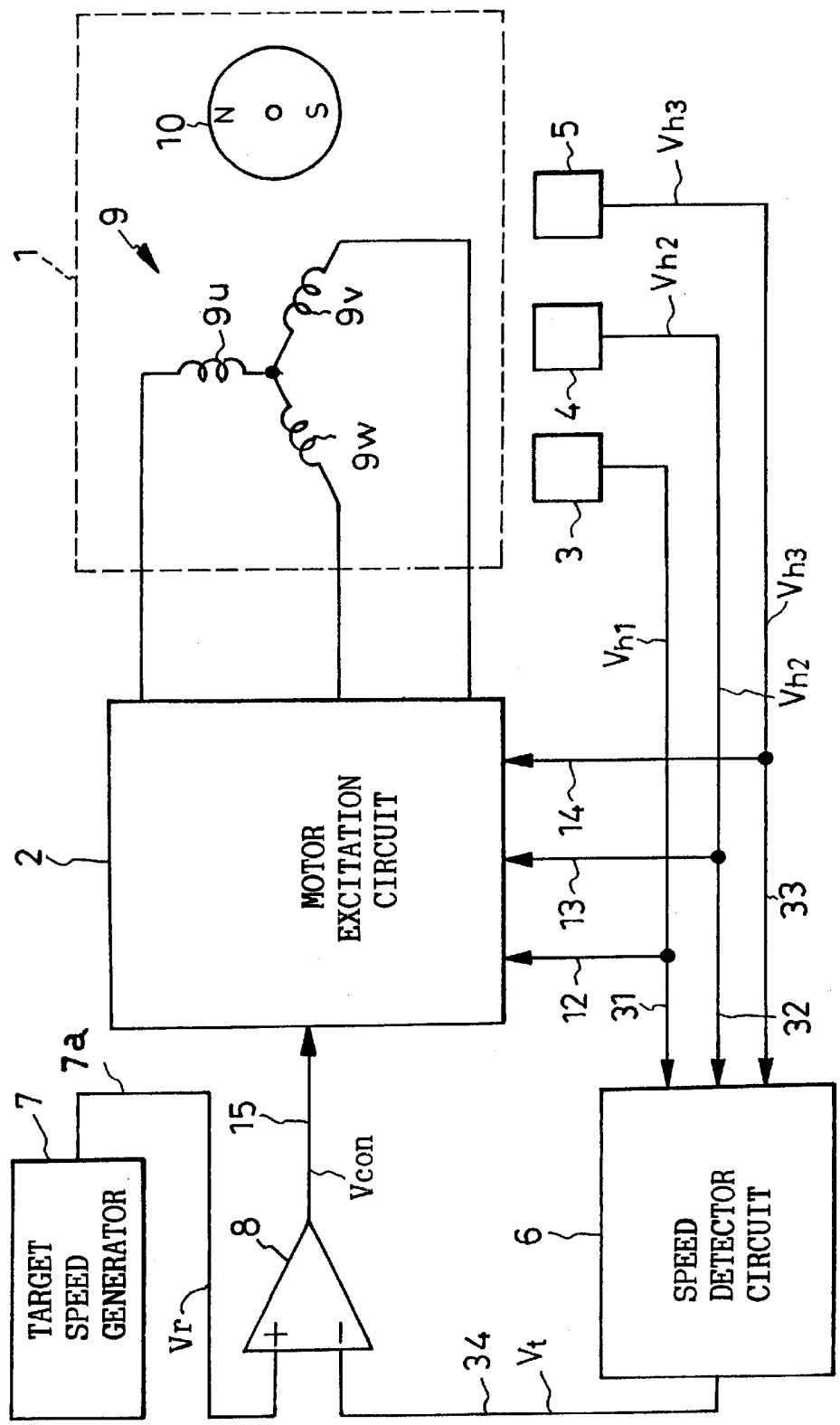
FIG. 1 is a block diagram of the first preferred form of speed control system for a brushless d.c. motor according to the present invention.

The general configuration of the brushless d.c. motor speed control system according to the invention will be understood from a brief study of FIG. 1. The brushless d.c. motor 1 is shown in this figure only insofar as is necessary for an understanding of its speed control system, and is to be detailed with reference to FIG. 2. Suffice it to say for the moment that the motor 1 comprises a stator 9 including three phase windings 9u, 9v and 9w, and a rotor 10.

Broadly, the motor speed control system comprises: (a) a motor excitation circuit 2 of largely conventional make for controllably exciting the stator windings 9u, 9v and 9w of the motor 1; (b) three magnetoelectric converters 3, 4 and 5 such as those built on the familiar Hall effect for providing rotor position signals indicative of the angular position of the rotor 10 of the motor relative to the stator 9; (c) a speed detector circuit 6 for detecting the actual rotational speed of the motor 1 from the rotor position signals and putting out a motor speed signal Vt; (d) a target speed signal generator 7 for providing a target speed signal Vr representative of a desired motor speed; and (e) a differential amplifier 8 having inputs connected to the speed detector circuit and the target speed signal generator 7 for producing a motor speed control signal Vcon representative of the difference between the actual motor speed signal Vt and the target speed signal Vr, for application to the excitation circuit 2 in order to cause the same to excite the motor windings 9u, 9v and 9w for motor rotation at the desired speed.

The brushless c.d. motor 1 with the magnetoelectric converters 3–5, motor excitation circuit 2, and speed detector circuit 6 listed above will be hereinafter discussed in more detail, in that order and under separate headings. Various modifications of the speed detector circuit 6 in particular will also be disclosed.

Brushless D.C. Motor

Figure 2:
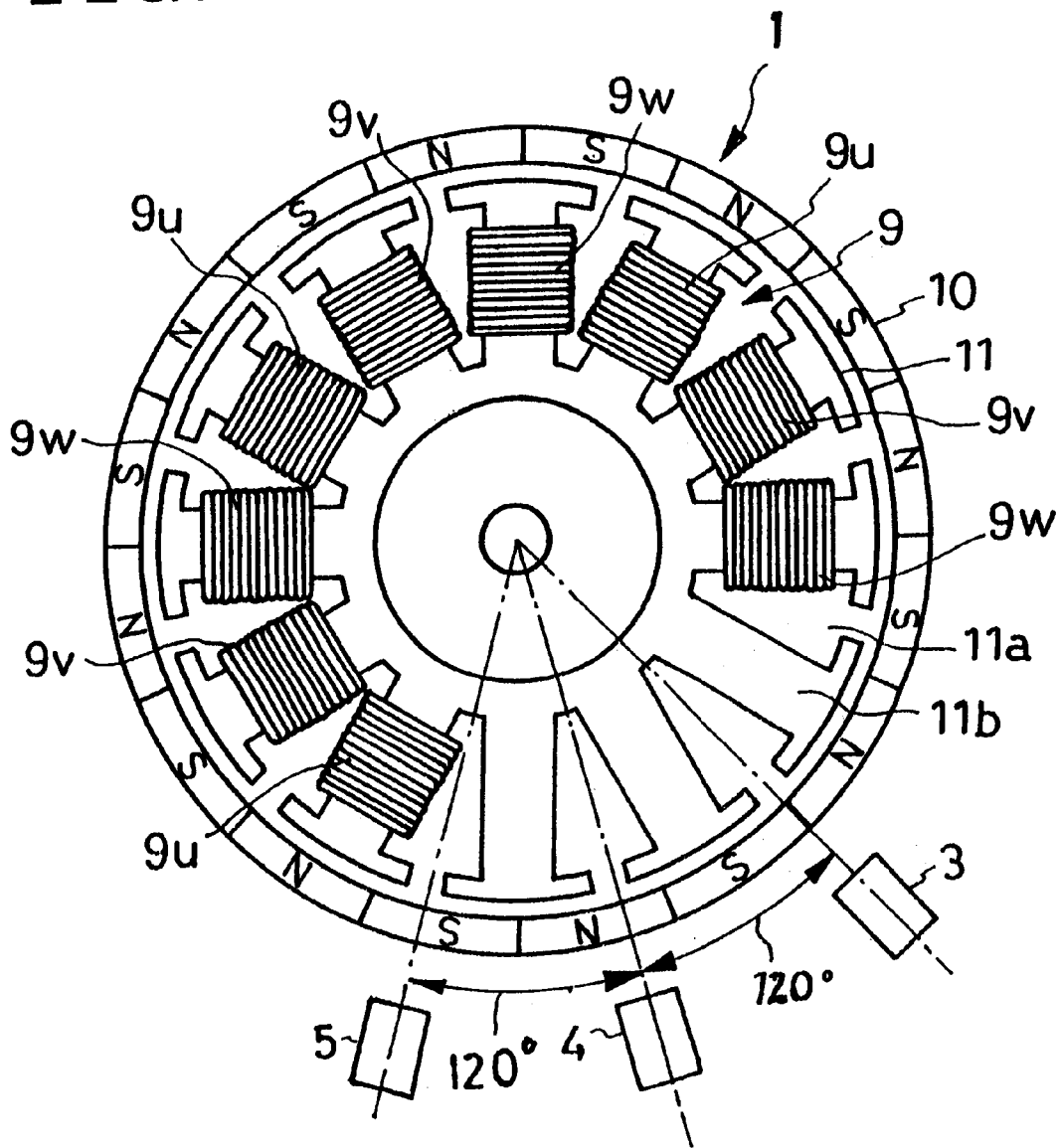
FIG. 2 is a sectional view of the motor controlled by the FIG. 1 system, the motor being shown together with the three magnetoelectric converters for providing as many rotor position signals with predetermined phase differences.

As illustrated in FIG. 2, the brushless d.c. motor 1 is of the known rotor-outside-stator configuration, with the stator 9 enclosed by the rotor 10, which is thus exposed. The stator 9 comprises the first 9u, second 9v and third 9w phase windings and a magnetic core 11. The core 11 has twelve slots 11a cut radially therein at constant angular spacings and so provide as many teeth 11b. Each divided into three interconnected parts, the three-phase windings 9u, 9v and 9w are wound on nine neighboring ones of the twelve core teeth 11b. It will be seen that the three-phase windings 9u,9v and 9w are arranged cyclically and in that order in a clockwise direction as seen here. The electrical angle between any two slots 11a, or any two teeth 11b, is therefore 120 degrees, or 2 Ti/3.

Three of the twelve stator teeth 11b are left unoccupied by the windings in the illustrated embodiment. The three magnetoelectric converters 3–5 are disposed in radial centerline alignment with the three stator slots 11a lying next to the three unoccupied teeth. The electrical angles between these magnetoelectric converters are therefore also 120 degrees.

The above noted arrangement of the magnetoelectric converters 3–5 is intended to mitigate the influence of the magnetic fields due to the windings 9u, 9v and 9w on these converters. In cases this is no appreciable advantage, however, windings may be provided on all the twelve stator teeth 11b. Either way, the three magnetoelectric converters 3–5 of the FIG. 2 arrangement will provide three rotor position signals with phase differences of 120 degrees.

Figure 5:
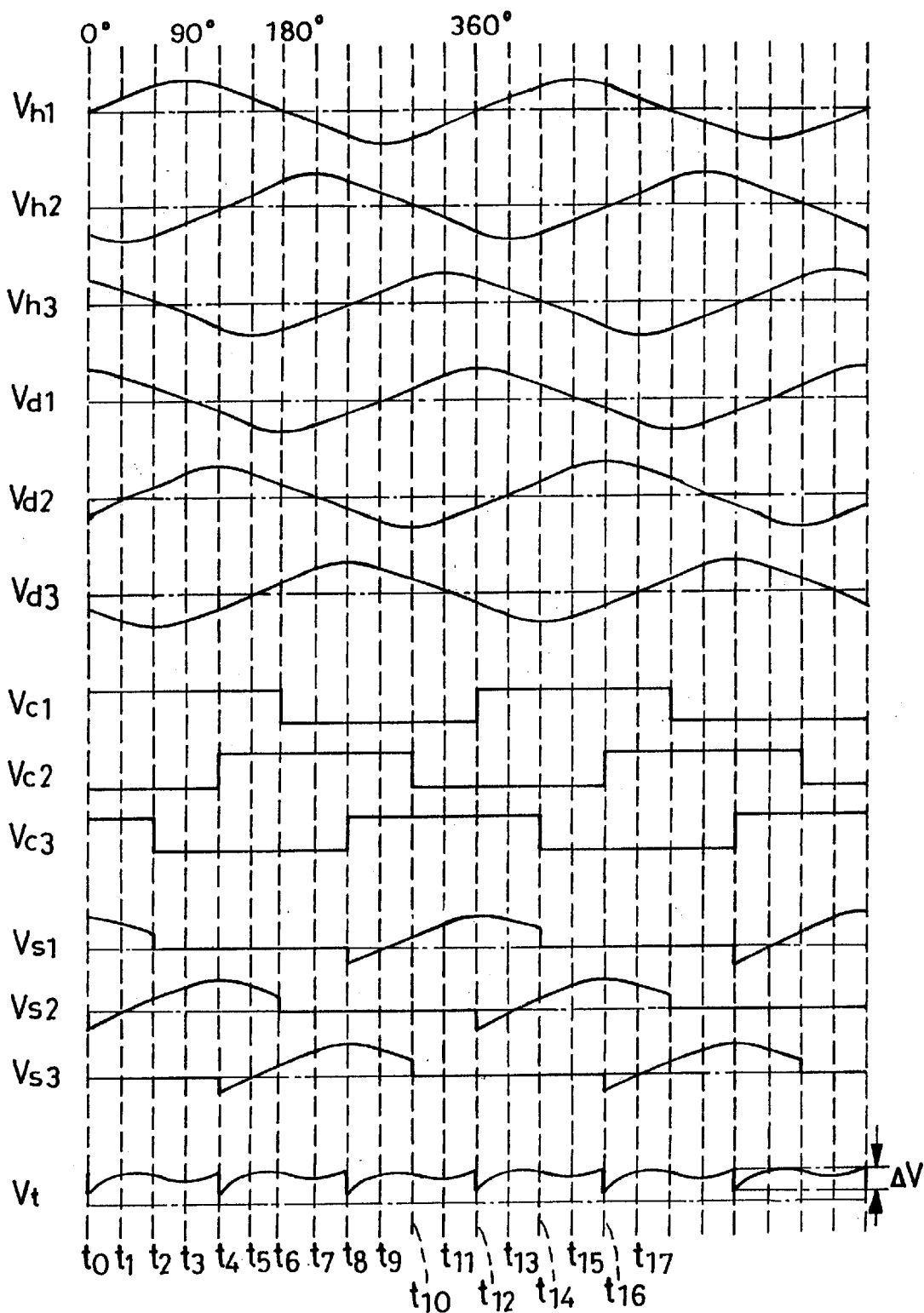
FIG. 5 is a diagram of waveforms useful in explaining the operation of the FIG. 4 speed detector circuit.

The rotor 10 is tubular in shape, concentrically surrounding the stator core 11 and itself divided into eight north- and eight south-seeking magnetic pole sections N and S alternating in its circumferential direction. Immovably supported outside the rotor 10 in prescribed positional relationship to the three-phase windings 9u, 9v and 9w, the three magnetoelectric converters 3–5 are so arranged as to detect magnetic fluxes due to the rotor 10. Therefore, with the rotation of the rotor 10 relative to the stator 9, the first to third magnetoelectric converts 3–5 will provide first to third rotor position signals, $Vh_1$, $Vh_2$ and $Vh_3$, respectively in the form of alternating voltages of sinusoidal waveform with a phase lag of 120 degrees from one to the next (FIG. 5).

Motor Excitation Circuit

Figure 3:
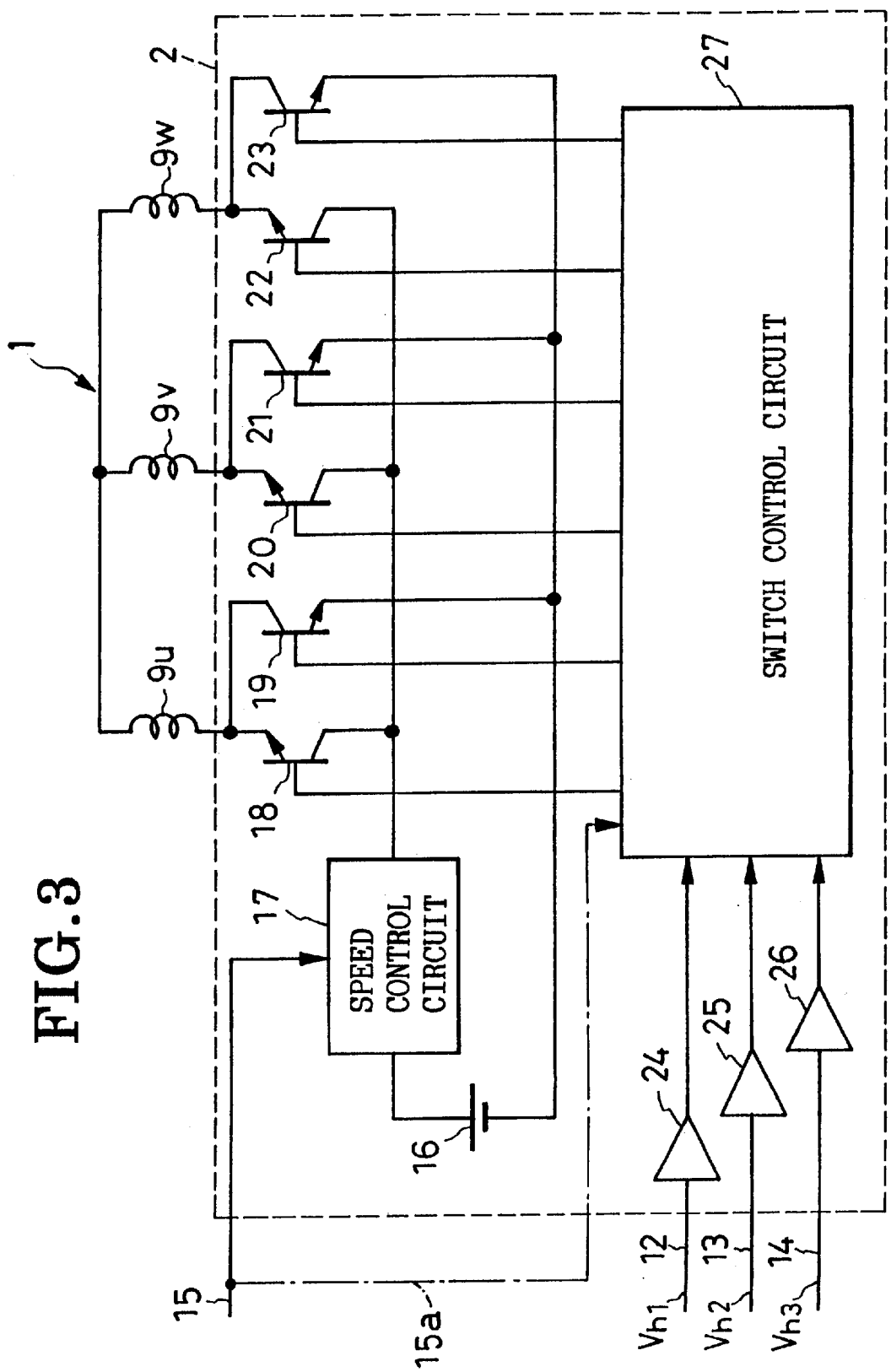
FIG. 3 is a schematic electrical diagram, partly in block form, of the motor excitation circuit of the FIG. 1 motor control system, shown together with the stator windings of the motor.

As illustrated in detail in FIG. 3, the motor excitation circuit 2 comprises a d.c. power supply 16, a speed control circuit 17 for controlling the rotational speed of the motor 1, a plurality of, six in this embodiment, switching transistors 18, 19, 20, 21, 22 and 23 for causing the three-phase stator windings 9u, 9v and 9w of the motor to be energized selectively, three amplifiers 24, 25 and 26 connected respectively to the magnetoelectric converts 3–5 by way of lines 12, 13 and 14 for amplifying the rotor position signals $Vh_1$, $Vh_2$ and $Vh_3$, and a switch control circuit 27 for making on-off control of the switching transistors 18–23 according to the amplified rotor position signals.

It will be noted from this figure that the three-phase stator windings 9u, 9v and 9w of the motor 1 are interconnected on one hand and, on the other, connected to one terminal of the power supply 16 via the first, third and fifth transistors 18, 20 and 22 and the speed control circuit 17 and also to the other terminal of that power supply via the second, fourth and sixth transistors 19, 21 and 23. The transistors 18–23 are all shown to be of npn type. Of these 18, 20 and 22 have their emitters connected to the motor windings 9u,9v and 9w, and their collectors to the power supply 16 via the speed control circuit 17. The other transistors 19, 21, and 23 have their collectors connected to the motor windings 9u, 9v and 9w, and their emitters connected directly to the power supply 16. The bases of all these transistors 18–23 are connected to the switch control circuit 27.

Per se of known construction, the switch control circuit 27 makes on-off control of the transistors 18–23 by the familiar two-phase excitation method in response to the three rotor position signals $Vh_1$, $Vh_2$ and $Vh_3$. Thus the switch control circuit 27 will cause conduction through the transistors 18 and 21 for simultaneous excitation of the motor windings 9u and 9v, through the transistors 20 and 23 for simultaneous excitation of the motor windings 9v and 9w, and through the transistors 19 and 22 for simultaneous excitation of the motor windings 9u and 9w.

The speed control circuit 17 functions to control the power fed from power supply 16 to motor windings 9u, 9v and 9w according to the speed control signal supplied from the differential amplifier 8, FIG. 1, over the line 15. The power may of course be augmented for higher motor speed and lessened for lower motor speed. Alternatively, for lower motor speed, the switch control circuit 27 may be caused to brake the motor 1 by energizing its windings in a direction of rotor rotation opposite to that in which it is currently rotating.

Notwithstanding the showing of FIG. 3, however, the provision of the speed control circuit 17 is not an absolute necessity; instead, the switch control circuit 27 may be modified to perform the additional function of motor speed control, in both increasing and decreasing direction, through on-off control of the transistors 18–23. The speed control signal line 15 may be connected directly to such a modified switch control circuit, as indicated at 15a. For such motor speed control the modified switch control circuit may be equipped to produce speed control pulses such that their durations are modulated according to the incoming speed control signal. The repetition rate of such duration-modulated speed control pulses should be sufficiently less than that of the pulses for causing motor rotation, and each such motor rotation pulse may be constituted of a series of speed control pulses.

Still another option is available for motor speed control: The resistance value of each of the transistors 18–23 may be controlled during their periods of conduction.

Speed Detector Circuit

The speed detector circuit 6, constituting the gist of the instant invention, does not relay on any external speed sensor other than the standard magnetoelectric converters 3–5 for motor speed detection, as will be noted from FIG. 1. Inputting the rotor position signals $Vh_1$, $Vh_2$ and $Vh_3$ over lines 31, 32 and 33, the speed detector circuit 6 puts out the motor speed signal Vt for delivery to the differential amplifier 8 over a line 34.

Figure 4:
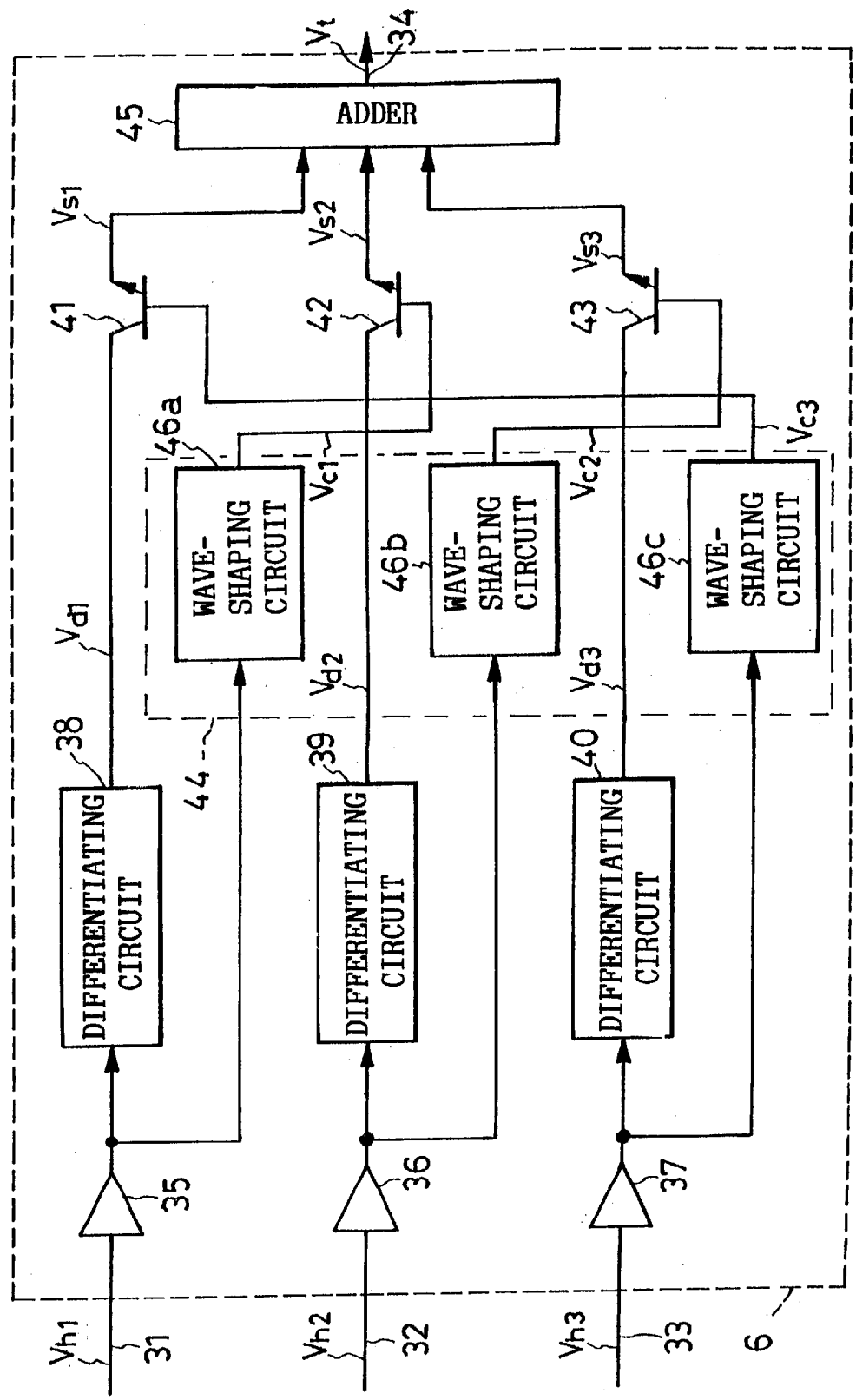
FIG. 4 is a block diagram of the speed detector circuit of the FIG. 1 motor control system, the speed detector circuit forming the gist of this invention.

FIG. 4 is a detailed illustration of the speed detector circuit 6. The following discussion of this circuit 6 will be better understood by referring also to FIG. 5 which indicates the waveforms of the signals appearing in various parts of the circuit.

The speed detector circuit 6 comprises: (a) input amplifiers 35, 36 and 37 connected respectively to the input lines 31, 32 and 33 for amplifying the rotor position signals $Vh_1$, $Vh_2$ and $Vh_3$; (b) differentiating circuits 38, 39 and 40 connected respectively to the amplifiers 35, 36 and 38 for differentiating the amplified rotor position signals; (c) switching transistors 41, 42 and 43 connected respectively to the differentiating circuits 38, 39 and 40 for passing parts of their output signals $Vd_1$, $Vd_2$ and $Vd_3$ as partial motor speed signals $Vs_1$, $Vs_2$ and $Vs_3$; (d) a binary signal forming circuit 44 for on-off control of the transistors 41, 42 and 43; and (e) an adder 45 for adding the partial motor speed signals $Vs_1$, $Vs_2$ and $Vs_3$ into a desired motor speed signal Vt representative of the running speed of the motor.

Connected to the rotor position signal lines 31–33 via the amplifiers 35–37, the differentiating circuits 38–40 put out the voltage signals $Vd_1$, $Vd_2$ and $Vd_3$ which, as shown in FIG. 5, are 90 degrees advanced in phase with respect to the rotor position signals $Vh_1$, $Vh_2$ and $Vh_3$. Although these voltage signals $Vd_1$, $Vd_2$ and $Vd_3$ contain information on motor speed, a simple addition of these alternating voltages would not provide a unidirectional motor speed signal because then unnecessary mutual cancellation would occur among them. It might be contemplated to add the signals $Vd_1$, $Vd_2$ and $Vd_3$ together after their full-wave rectification by diodes. Full-wave rectification by diodes would not suit very low voltages produced by the magnetoelectric converts 3–5, FIG. 1, when the motor is in low speed rotation. Full-wave rectification by switches or amplifiers, instead, might be possible but is definitely impractical because of the unjustifiable complexity and expensiveness of the circuitry required.

The solution proposed by the instant invention is the extraction, for subsequent addition, of the positive half-cycles of the sinusoidal output signals $Vd_1$, $Vd_2$ and $Vd_3$ of the differentiating circuits 38–40 by means of the switching transistors 41, 42 and 43. These transistors are, moreover, turned on and off by the binary switch control signals $Vc_1$, $Vc_2$ and $Vc_3$ derived from the amplified rotor position signals $Vh_1$, $Vh_2$ and $Vh_3$ by the binary signal forming circuit 44.

The binary signal forming circuit 44 is comprised of only three wave-shaping circuits 46a, 46b and 46c in this particular embodiment, which are connected respectively between the outputs of the amplifiers 35, 36 and 37 and the bases of the transistors 42, 43 and 41. In practice the wave-shaping circuits 46a, 46b and 46c may take the form of comparators, producing the binary switch control signals $Vc_1$, $Vc_2$ and $Vc_3$ by translating the positive half-cycles of the rotor position signals $Vh_1$, $Vh_2$ and $Vh_3$ into rectangular wave trains. The binary switch control signals $Vc_1$, $Vc_2$ and $Vc_3$ are of course obtainable by connecting one input of each comparator to one of the amplifiers 35, 36 and 37 and grounding the other input.

A comparison of the output voltage $Vd_1$ of the first differentiating circuit 38 and the binary switch control signal $Vc_3$ from the third wave-shaping circuit 46c in FIG. 5 will indicate that the signal $Vc_3$ is only 30 degrees advanced in phase from the signal $Vd_1$. The third switch control signal $Vc_3$ can therefore be used for on-off control of the first transistor 41, so that the output of the third wave-shaping circuit 36c is shown connected to the base of the first transistor 41. There is thus obtained on the output side of the first transistor 41 the first partial motor speed signal $Vs_1$ which is equivalent to the −30° to +150° segment of each cycle of the first differentiating circuit output $Vd_1$. The negative segments included in this first partial motor speed signal $Vs_1$, as from −30° to 0°, are negligible compared to its positive segments, as from 0° to 150°, in terms of both duration and amplitude.

An inspection of FIG. 5 will further reveal that a phase relationship similar to that discussed above between first differentiating circuit output $Vd_1$ and third binary switch control signal $Vc_3$ also exists between second differentiating circuit output $Vd_2$ and first binary switch control signal $Vc_1$, and between third differentiating circuit output $Vd_3$ and second binary switch control signal $Vc_2$. The first wave-shaping circuit 46a is therefore connected to the base of the second transistor 42, and the second wave-shaping circuit 46b to the base of the third transistor 43. The second and third partial motor speed signals $Vs_2$ and $Vs_3$ are thus obtained on the output side of the second and third transistors 42 and 43.

The first to third partial motor speed signals $Vs_1$, $Vs_2$ and $Vs_3$ are all directed into the adder 45 thereby to be combined into the unidirectional motor speed signal Vt. The partial motor speed signals $Vs_1$, $Vs_2$ and $Vs_3$ have phase differences of 120 degrees, and each goes negative only during 30 degrees of each cycle. Experiment has proved that the maximum percent ripple ΔV of the motor speed signal thus obtained according to the invention is 50%.

With reference back to FIG. 1 the motor speed Signal Vt thus produced by the speed detector circuit 6 is directed to one input of the differential amplifier 8, to the other input of which is supplied a voltage signal representative of a desired motor speed from the target speed signal generator 7. The resulting output from the differential amplifier 8 is a motor speed control signal in the form of a voltage difference between motor speed signal Vt and target speed signal. As has been explained with reference to FIG. 3, the motor excitation circuit 2 will energize the three-phase windings 9u, 9v and 9w of the motor 1 for rotation at the desired speed in response to the motor speed control signal.

As has been set forth hereinbefore with reference to FIGS. 1–5, the motor speed control system according to the invention utilizes the rotor position signals $Vh_1$, $Vh_2$ and $Vh_3$ from the standard magnetoelectric converters 3–5 for production of the motor speed signal Vt indicative of actual motor speed. Such converters have been customarily built into this type of motor in disk drive applications for excitation control purposes and are used for the same purposes, beside being used for motor speed detection, in this and all the other embodiments of the invention to be disclosed subsequently, too. The speed control system according to the invention is therefore much simpler and far less expensive in construction compared to prior art speed control systems employing speed sensors for motor speed detection.

Perhaps a most pronounced feature of the FIGS. 1–5 embodiment resides in the method of making on-off control of the switching transistors 41–43, FIG. 4, of the speed detector circuit 6. The rotor position signals $Vh_1$, $Vh_2$ and $Vh_3$ from the magnetoelectric converters 3–5 are turned into the binary signals $Vc_1$, $Vc_2$ and $Vc_3$ by the wave-shaping circuit 46a–46c. The first binary signal $Vc_1$ is used for on-off control of the second transistor 42, the second binary signal $Vc_2$ for that of the third transistor 43, and the third binary signal $Vc_3$ for that of the first transistor 41. The three partial motor speed signals $Vs_1$, $Vs_2$ and $Vs_3$ thus obtained from the transistors are then combined into the unidirectional motor speed signal Vt, such that its ripple percentage is reduced to a level that has proved to present no problem at all in practice.

Second Form

Figure 6:
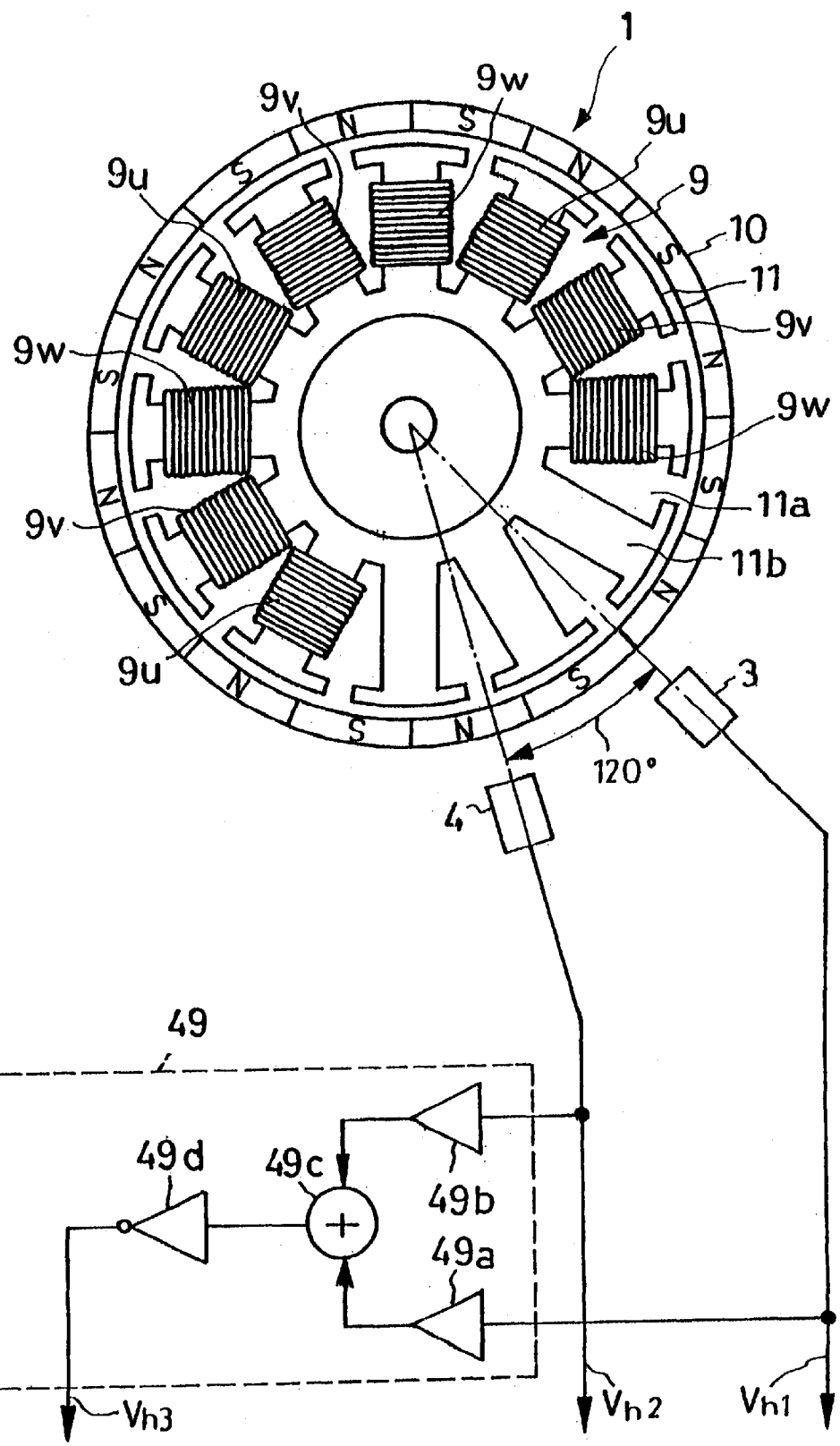
FIG. 6 is similar to FIG. 2 but shows the motor together with two magnetoelectric converters and associated circuit means for production of three rotor position signals.

The present invention is applicable to the speed control of brushless d.c. motors furnished with but two magnetoelectric converters, instead of three as in the foregoing embodiment. FIG. 6 shows such a motor 1 with two magnetoelectric converters 3 and 4, which are disposed in the same positions with respect to the motor as their FIG. 2 counterparts 3 and 4. The absence of the third magnetoelectric converter is overcome by creating a third rotor position signal from the rotor position signals produced by the two magnetoelectric converters 3 and 4.

Employed to that end, in place of the third magnetoelectric converter 5 of the preceding embodiment, is a circuit designated 49 in FIG. 6. This third rotor position signal forming circuit, so to say, comprises two amplifiers 49a and 49b, an adder 49c, and a phase inverter 49d. Connected to the two magnetoelectric converters 3 and 4 via the amplifiers 49a and 49b, the adder 49c vectorially adds together the two rotor position signals $Vh_1$ and $Vh_2$ having a phase difference of 120 degrees. The resulting output from the adder 49c is then inverted in phase by the inverter 49c, for delivery as the third rotor position signal $Vh_3$ to both motor excitation circuit 2, FIG. 1, and speed detector circuit 6. This third rotor position signal $Vh_3$ has substantially the same voltage waveform as indicated by the same indicia in FIG. 5.

An advantage gained by this second embodiment is the greater simplicity in construction arising from use of but two magnetoelectric converters 3 and 4. Since three rotor position signals are nevertheless obtained from the two magnetoelectric converters, a speed detector circuit of the same construction as shown in FIG. 4 can be employed for processing them into a motor speed signal.

Third Form

Figure 7:
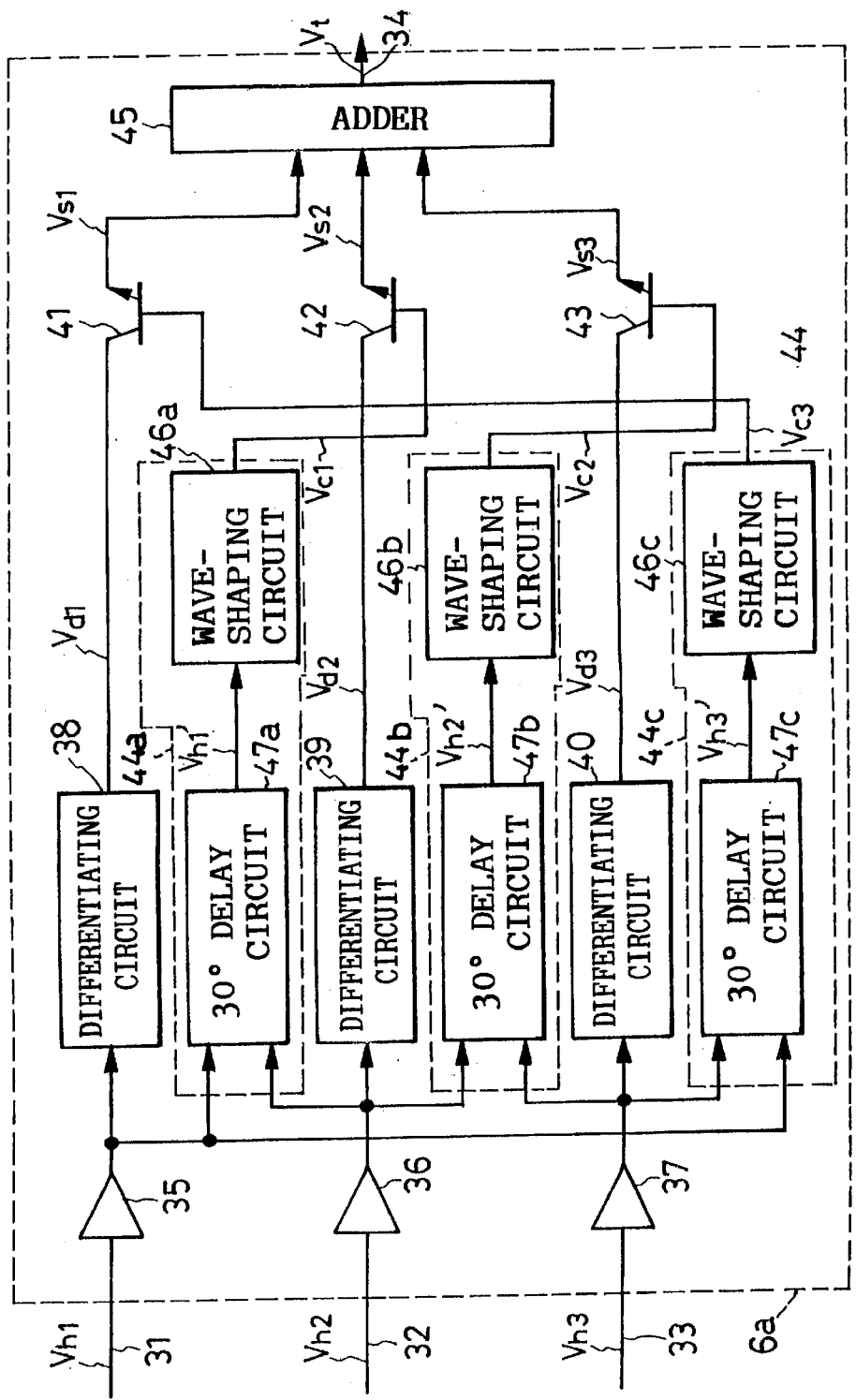
FIG. 7 is a block diagram of another preferred embodiment of the invention, featuring a modified speed detector circuit for use in the FIG. 1 speed control system in place of the FIG. 4 speed detector circuit.

FIG. 7 shows a modified speed detector circuit 6a for use in the FIG. 1 motor speed control system in place of the speed detector circuit 6. The modified speed detector circuit 6a employs binary signal forming circuits 44a, 44b and 44c, in lieu of the FIG. 4 binary signal forming circuit 44, for on-off control of the switching transistors 41–43. Each of the binary signal forming circuits 44a, 44b and 44c is a serial connection of a 30-degree delay circuit 47a, 47b or 47c and a wave-shaping circuit 46a, 46b or 46c. The delay circuits 47a, 47b and 47c impart a 30-degree phase delay to the three rotor position signals $Vh_1$, $VH_2$ and $Vh_3$, respectively, and the wave-shaping circuits 46a, 46b and 46c translate the delayed rotor position signals $Vh_1'$, $Vh_2'$ and $Vh_3'$ into binary switch control signals $Vc_1$, $Vc_2$ and $Vc_3$, respectively.

More specifically, the delay circuit 47a of the first binary signal forming circuit 44a has inputs connected to both amplifiers 35 and 36 for processing the amplified first and second rotor position signals $Vh_1$ and $Vh_2$ into the first delayed rotor position signal $Vh_1'$. The wave-shaping circuit 46a and the first binary signal forming circuit 44a has an output connected to the base of the second switching transistor 42 for on-off control thereof by the first binary switch control signal $Vc_1$. The delay circuit 47b of the second binary signal forming circuit 44b has inputs connected to both amplifiers 36 and 37 for processing the amplified second and third rotor position signals $vh_2$ and $Vh_3$ into the second delayed rotor position signal $Vh_2'$. The wave-shaping circuit 46b of the second binary signal forming circuit 44b has an output connected to the base of the third switching transistor 43 for on-off control thereof by the second binary switch control signal $Vc_2$. The delay circuit 47c of the third binary signal forming circuit 44c has inputs connected to both amplifiers 35 and 37 for processing the amplified first and third rotor position signals $Vh_1$ and $Vh_3$ into the third delayed rotor position signal $Vh_3'$. The wave-shaping circuit 46c of the third binary signal forming circuit 44c has an output connected to the base of the first switching transistor 41 for on-off control thereof by the third binary switch control signal $Vc_3$.

Figure 8:
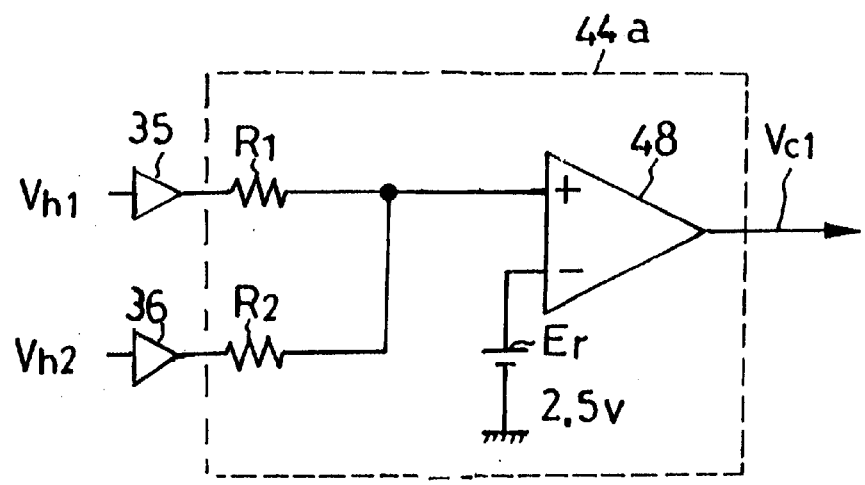
FIG. 8 is a schematic electrical diagram showing in more detail one of the binary signal forming circuits of the FIG. 7 speed detector circuit.

The delay circuit 47a, 47b or 47c and wave-shaping circuits 46a, 46b and 46c of each binary signal forming circuit 44a, 44b or 44c may not necessarily be discrete entities but may be parts of an essentially single circuit. FIG. 8 illustrates by way of example such an integrated first binary signal forming circuit 44a, it being understood that the second and third circuits 44b and 44c are each of like construction except for connections of their inputs and outputs to other parts, which have been specified above. The exemplified first binary signal forming circuit 44a comprises two resistors $R_1$ and $R_2$ functioning as parts of a 30° delay circuit, an operational amplifier 48 functioning as wave-shaping circuit, and a reference voltage source Er.

Figure 9:
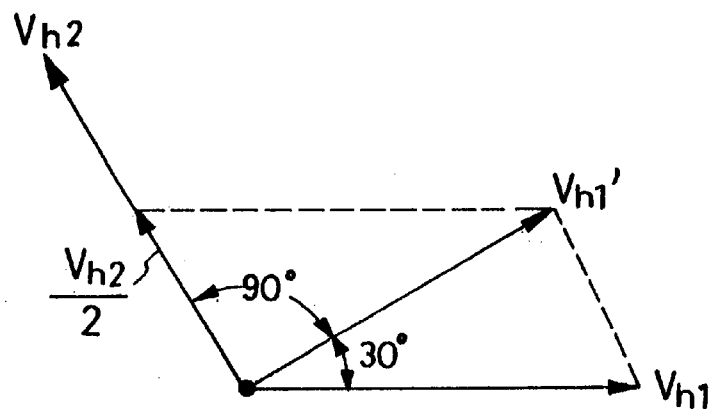
FIG. 9 is a vector diagram explanatory of how the rotor position signal is delayed by the FIG. 8 circuit.

The operational amplifier 48 has one input connected to both amplifiers 35 and 36 via the respective resistors $R_1$ and $R_2$, and another input connected to the reference voltage source Er. There are therefore impressed to the resistors $R_1$ and $R_2$ the first and the second amplified rotor position signals $Vh_1$ and $Vh_2$ from the magnetoelectric converters 3 and 4, FIG. 1. The first resistor $R_1$ is understood to have a resistance value that is half that of the second resistor $R_2$. These resistors $R_1$ and $R_2$ have their output sides interconnected. In consequence, as indicated in FIG. 9, the rotor position signals $Vh_1$ and $Vh_2$ with a phase difference of 120 degrees therebetween are added together at a rate of two to one, thereby providing the first delayed rotor position signal $Vh_1'$, which lags 30 degrees behind the first rotor position signal $Vh_1$, for delivery to the operational amplifier 48.

It is understood that the reference voltage from the source Er is equal to the mean value (e.g. 2.5 volts) of the rotor position signals $Vh_1$, $Vh_2$ and $Vh_3$. The operational amplifier 48 goes high when the fist delayed rotor position signal $Vh_1'$ is higher than the reference voltage Er, and low when the first delayed rotor position signal is less than the reference voltage. Thus the positive half-cycles of the delayed rotor position signal $Vh_1'$ from the operational amplifier 48 are converted into the first binary switch control signal $Vc_1$ in FIG. 10.

Figure 10:
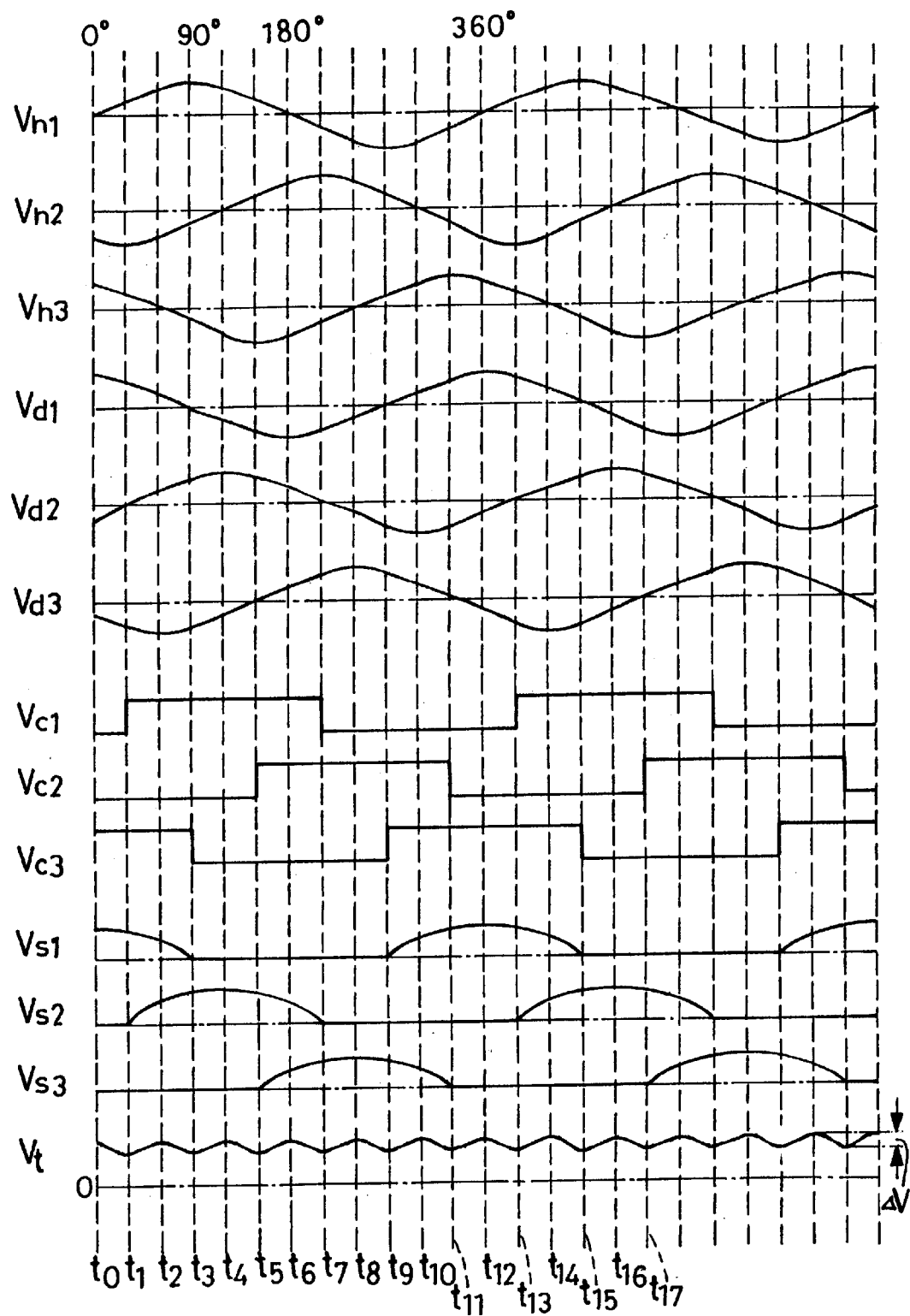
FIG. 10 is a diagram of waveforms useful in explaining the operation of the FIG. 7 speed detector circuit.

It is self-evident that, as will be understood by referring back to FIG. 7, the second binary signal forming circuit 44b combines the second and third rotor position signals $Vh_2$ and $Vh_3$ at a rate of two to one into the second delayed rotor position signal $Vh_2'$ and reshapes this signal into the second binary switch control signal $Vc_2$ shown also in FIG. 10. The third binary signal forming circuit 44c likewise combines the third and first rotor position signals $Vh_3$ and $Vh_1$ at a rate of two to one into the third delayed rotor portion signal $Vh_3'$ and reshapes this signal into the third binary switch control signal $Vc_3$ shown also in FIG. 10.

The three delayed rotor position signals $Vh_1'$, $Vh_2'$ and $Vh_3'$ lag 30 degrees in phase behind the FIG. 10 rotor position signals $Vh_1$, $VH_2$ and $Vh_3$. The three binary switch control signals $Vc_1$, $Vc_2$ and $Vc_3$ derived from these delayed rotor position signals are therefore as indicated also in FIG. 10. A comparison of FIGS. 5 and 10 will show that the FIG. 10 switch control signals $Vc_1$, $Vc_2$ and $VC_3$ lag 30 degrees behind their FIG. 5 counterparts. The FIG. 10 switch control signals $Vc_1$, $Vc_2$ and $Vc_3$ agree in phase with the second, third and first differentiating circuit outputs $Vd_2$, $Vd_3$ and $Vd_1$, respectively.

Thus, as the transistors 41, 42 and 43 of the FIG. 7 speed detector circuit 6a are turned on and off by the binary switch control signals $Vc_3$, $Vc_1$ and $Vc_2$, respectively, the differentiating circuit outputs $Vd_1$, $Vd_2$ and $Vd_3$ will be broken up into the three partial motor speed signals $Vs_1$, $Vs_2$ and $Vs_3$, FIG. 10, which are all positive half waves, from zero to 180 degrees, of the differentiating circuit outputs.

The adder 45 of the FIG. 7 speed detector circuit 6a will combine the three-phase half-wave signals $Vs_1$, $Vs_2$ and $Vs_3$ into the unidirectional motor speed signal Vt shown in FIG. 10. The ripple percentage ΔV of this motor speed signal Vt is as low as 13 percent, compared to that of 50 percent in the first disclosed embodiment.

Fourth Form

Figure 11:
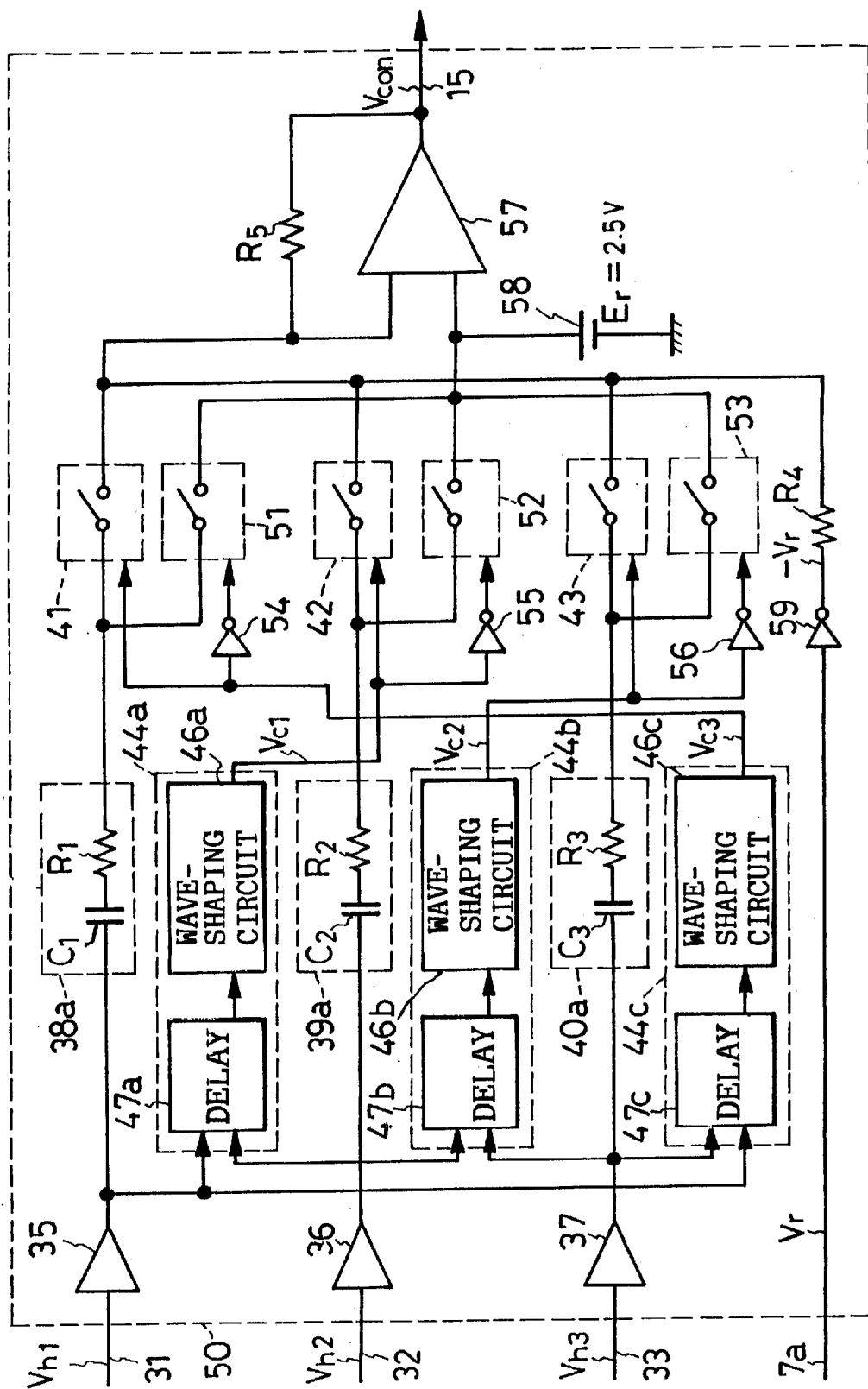
FIG. 11 is a block diagram of still another preferred embodiment of the invention, featuring a speed control signal forming circuit for use in the FIG. 1 speed control system in place of the FIG. 4 speed detector circuit and the differential amplifier.

The speed detector circuit 6 and the differential amplifier 8 of the FIG. 1 motor speed control system can be combined into that may be termed a speed control circuit, capable of producing a speed control signal for direct application to the motor excitation circuit 2. FIG. 11 shows an example of such speed control circuit 50. Essentially, this circuit 50 is a streamlined combination of the FIG. 7 speed detector circuit 6a and FIG. 1 differential amplifier 8, to be coupled directly to the motor excitation circuit 2.

The speed control circuit 50 comprises: (a) capacitor-resistor circuits 38a, 38b and 38c connected to the rotor position signal input lines 31, 32 and 33 via the buffer amplifiers 35, 36 and 37; (b) the noted switches 41, 42 and 43 connected to the CR circuits 38a, 38b and 38c, (c) a second set of switches 51, 52 and 53 also connected to the CR circuits 38a, 38b and 38c for discharging the capacitors $C_1$, $C_2$ and $C_3$; (d) the binary signal forming circuits 44a, 44b and 44c for producing the binary switch control signals $Vc_1$, $Vc_2$ and $Vc_3$ for direct on-off control of the first set of switches 42, 43 and 41 and, via inverter circuits 55, 56 and 54, of the second set of switches 52, 53 and 51; and (e) an operational amplifier 57 forming a part of a differentiating and an adding circuit.

The serial circuits 38a, 39b and 39c of capacitor $C_1$ and resistor $R_1$, capacitor $C_2$ and resistor $R_2$, and capacitor $C_3$ and resistor $R_3$ function somewhat like the FIG. 7 differentiating circuits 38, 39 and 40. Comprised of the delay circuits 47a, 47b and 47c and the wave-shaping circuits 46a, 46b and 46c, the binary signal forming circuits 44a, 44b and 44c operate just like their FIG. 7 counterparts bearing the same reference characters, producing the switch control signals $Vc_1$, $Vc_2$ and $Vc_3$ from the amplified rotor position signals $Vh_1$, $Vh_2$ and $Vh_3$.

The operational amplifier 57 has one input connected to the CR circuits 38a, 39b and 40a via the first set of switches 41, 42 and 43 and to the noted target speed signal line 7a via a resistor $R_4$ and a polarity inverter circuit 59, beside being connected to its own output via a feedback resistor $R_5$. The other input of the operational amplifier is grounded via a source 58 of a reference voltage Er, which is 2.5 volts in this particular embodiment. This reference voltage source 58 is further connected to the CR circuits 38a, 39a and 40a via the second set of switches 51, 52 and 53. Controlled by the phase inversions, made by the inverter circuits 54, 55 and 56, of the switch control signal $Vc_3$, $Vc_1$ and $Vc_2$ from the binary signal forming circuits 44c, 44a and 44b, the second set of switches 51, 52 and 53 turn on and off in opposite relationship to the first set of switches 41, 42 and 43. Thus, closed while the first set of switches 41, 42 and 43 are open, the second set of switches 51, 52 and 53 function to discharge and reset the capacitors $C_1$, $C_2$ and $C_3$.

Functionally, the FIG. 11 speed control circuit 50 is equivalent to the FIG. 7 speed control circuit 6a plus the FIG. 1 differential amplifier 8. More specifically, the binary signal forming circuits 44a, 44b and 44c derive the binary switch control signals $Vc_2$, $Vc_2$ and $Vc_3$ from the amplified rotor position signals $Vh_1$, $Vh_2$ and $Vh_3$. The switch control signals $Vc_1$, $Vc_2$ and $Vc_3$ are akin to those drawn in FIG. 10. The first set of switches 41, 42 and 43 are closed when the switch control signals $Vc_3$, $Vc_1$ and $Vc_2$ are high, and open when they are low. The second set of switches 51, 52 and 53 are closed when the switch control signals $Vc_3$, $Vc_1$ and $Vc_2$ are low, and open when they are high.

Let us assume that only the first rotor position signal $Vh_1$ is being input to the FIG. 11 speed control circuit 50. The switch 41 will be closed, as from $t_9$ to $t_{15}$ in FIG. 10, under the control of the switch control signal $Vc_3$ from the third binary signal forming circuit 44c, thereby passing the positive half waves of the output (similar to the output $Vd_1$ of the FIG. 7 differentiating circuit 38) from the CR circuit 38a. The capacitor $C_1$ of this CR circuit 38a will be discharged when the switch 41 is open, that is, when the switch 51 is closed, as from $t_3$ to $t_9$ in FIG. 10. There will thus be obtained on the output side of the switch 41 a signal analogous with the first partial motor speed signal $Vs_1$, FIG. 10, of the FIG. 7 speed detector circuit 6a.

Similarly, if only the second rotor position signal $Vh_2$ is being input to the FIG. 11 speed control circuit 50, the switches 42 and 52 will be controlled by the switch control signal $Vc_1$ from the first binary signal forming circuit 44a. Thus a signal similar to the second partial motor speed signal $Vs_2$, FIG. 10, of the FIG. 7 speed detector circuit 6a will be obtained.

If only the third rotor position signal $Vh_3$ is being input to the FIG. 11 speed control circuit 50, the switches 43 and 53 will be likewise controlled by the switch control signal $Vc_2$ from the second binary signal forming circuit 44b. A signal similar to the third partial motor speed signal $Vs_3$, FIG. 10, of the FIG. 7 speed detector circuit 6a will then be obtained.

Unlike their FIG. 7 counterparts bearing the same reference numerals, the first set of switches 41, 42 and 43 of the FIG. 11 speed control circuit 50 have their output sides interconnected for connection to one input of the operational amplifier 57. The second set of switches 51, 52 and 53 are likewise jointly connected to the reference voltage source 58. Consequently, if the target speed signal Vr were to be neglected, the operational amplifier 57 would put out an equivalence of the FIG. 10 motor speed signal Vt, which is produced by the adder 45 of the FIG. 7 speed detector circuit 6a in response to the three incoming partial motor speed signals $Vs_1$, $Vs_2$ and $Vs_3$.

Actually, as the target speed signal Vr is supplied from the target speed signal generator 7, FIG. 1, the operational amplifier 57 will put out the motor speed control signal Vcon by subtracting the target speed signal Vr from the actual motor speed signal Vt. The speed control signal Vcon is to be applied to the FIG. 1 motor excitation circuit 2 for causing the same to excite the three-phase motor windings 9u, 9v and 9w so as to cause motor rotation at the desired speed.

The operational amplifier 57 functions not merely as differentiator and adder but also as differential amplifier for providing the speed control signal Vcon. The target speed signal Vr on the input line 7a is inverted in polarity into –Vr by the inverter circuit 59 preparatory to delivery to the operational amplifier 57 via the resistor $R_4$. Therefore, during the conducting periods of the first set of switches 41, 42 and 43, currents will flow from these switches through the feedback resistor $R_4$. The current that will flow through this feedback resistor $R_4$ due to the negative polarity target speed signal –Vr, on the other hand, is oriented toward the inverter circuit 59. Thus a current subtraction, so to say, will take place at the feedback resistor $R_5$, resulting in the provision of the speed control signal Vcon, indicative of a difference between actual motor speed signal Vt and target motor speed signal Vr, on the output side of the operational amplifier 57.

The operational amplifier 57 of the FIG. 11 speed control circuit 50, capable of the triple functions explained above, constitutes the most pronounced feature of this fourth embodiment of the invention. It immensely contributes to the simplicity of this speed control circuit.

Another advantage of the FIG. 11 embodiment is the removal of d.c. components from the incoming rotor position signals $Vh_1$, $VhH_2$ and $Vh_3$ by the capacitors $C_1$, $C_2$ and $C_3$. Offset-free motor speed control will be possible as only the alternating components are allowed through the capacitors. It is also an advantage that the capacitors $C_1$, $C_2$ and $C_3$ can be positively reset by the second set of switches 51, 52 and 53 controlled by the phase inversions of the switch control signals $Vc_3$, $Vc_1$ and $Vc_2$ from the binary signal forming circuits 44c, 44a and 44b.

Fifth Form

Figure 12:
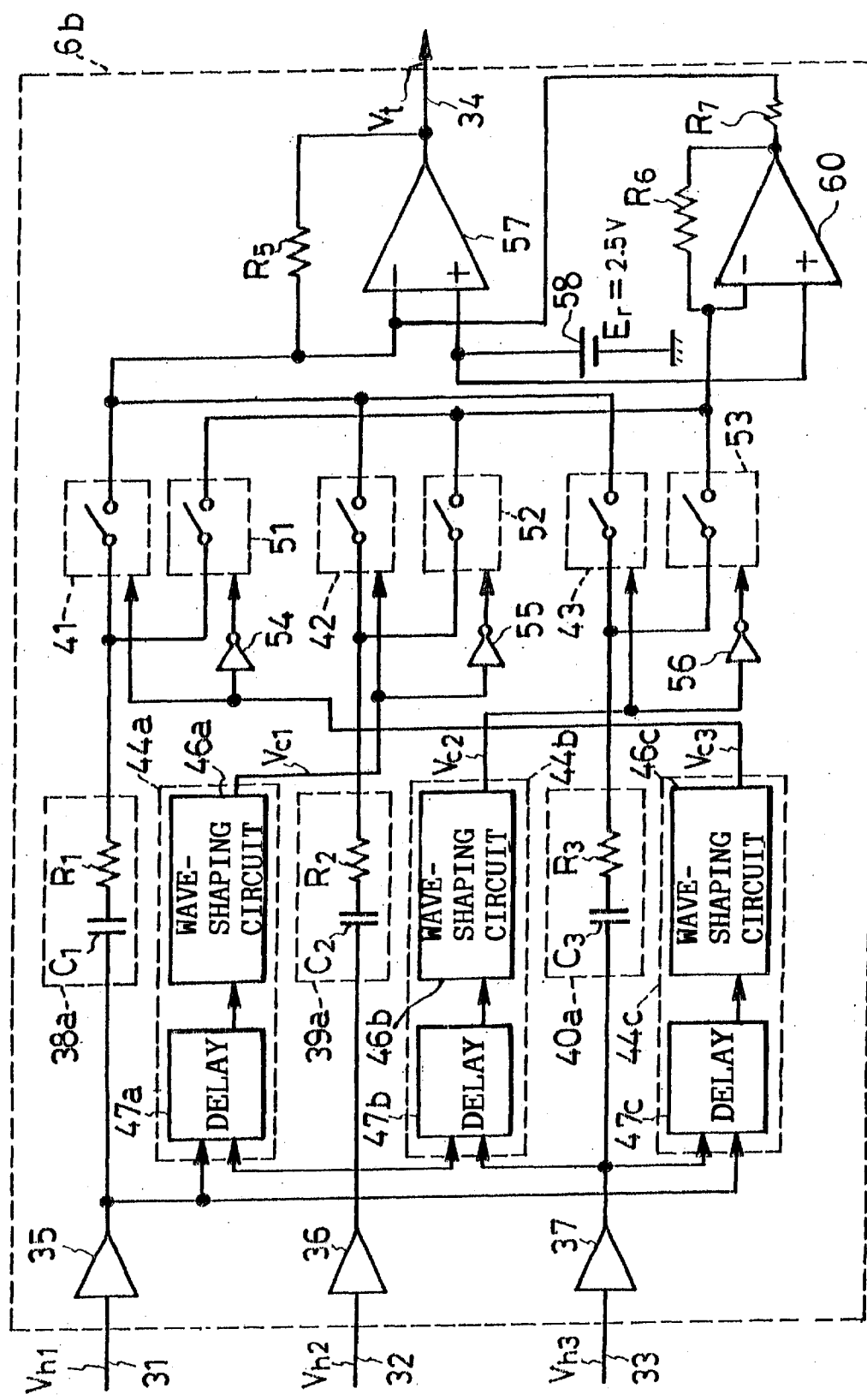
FIG. 12 is a block diagram of yet another preferred embodiment of the invention, featuring another modified speed detector circuit for use in the FIG. 1 speed control system in place of the FIG. 4 speed detector circuit.

Another modified motor speed detector circuit 6b shown in FIG. 12 is somewhat closer in construction to the FIG. 11 speed control circuit 50 than to the FIG. 4 speed detector circuit 6 or to its first modification 6a of FIG. 7. However, the speed detector circuit 6b is so named because it does not input the target speed signal Vr and does put out the actual motor speed signal Vt, rather than the motor control signal Vcon, for delivery to the differential amplifier 8, FIG. 12, over the line 34.

Thus the inverter circuit 59 and resistor $R_4$ of the FIG. 11 speed control circuit 50 are absent from this speed detector circuit 6b. Further, for providing the motor speed signal Vt as a full-wave rectification of the differentiations of the three rotor position signals $Vh_1$, $Vh_2$ and $Vh_3$, the speed detector circuit 6b comprises a second operational amplifier 60, a second feedback resistor $R_6$, and another resistor $R_7$. Other details of construction are the same as in FIG. 11.

The second operational amplifier 60 has a first input connected to the second set of switches 51, 52 and 53, a second input connected to the reference voltage source 58, and an output connected to its own first input via the feedback resistor $R_6$ and also, via the resistor $R_7$, to that input of the first operational amplifier 57 to which are connected the first set of switches 41, 42 and 43.

Figure 13:
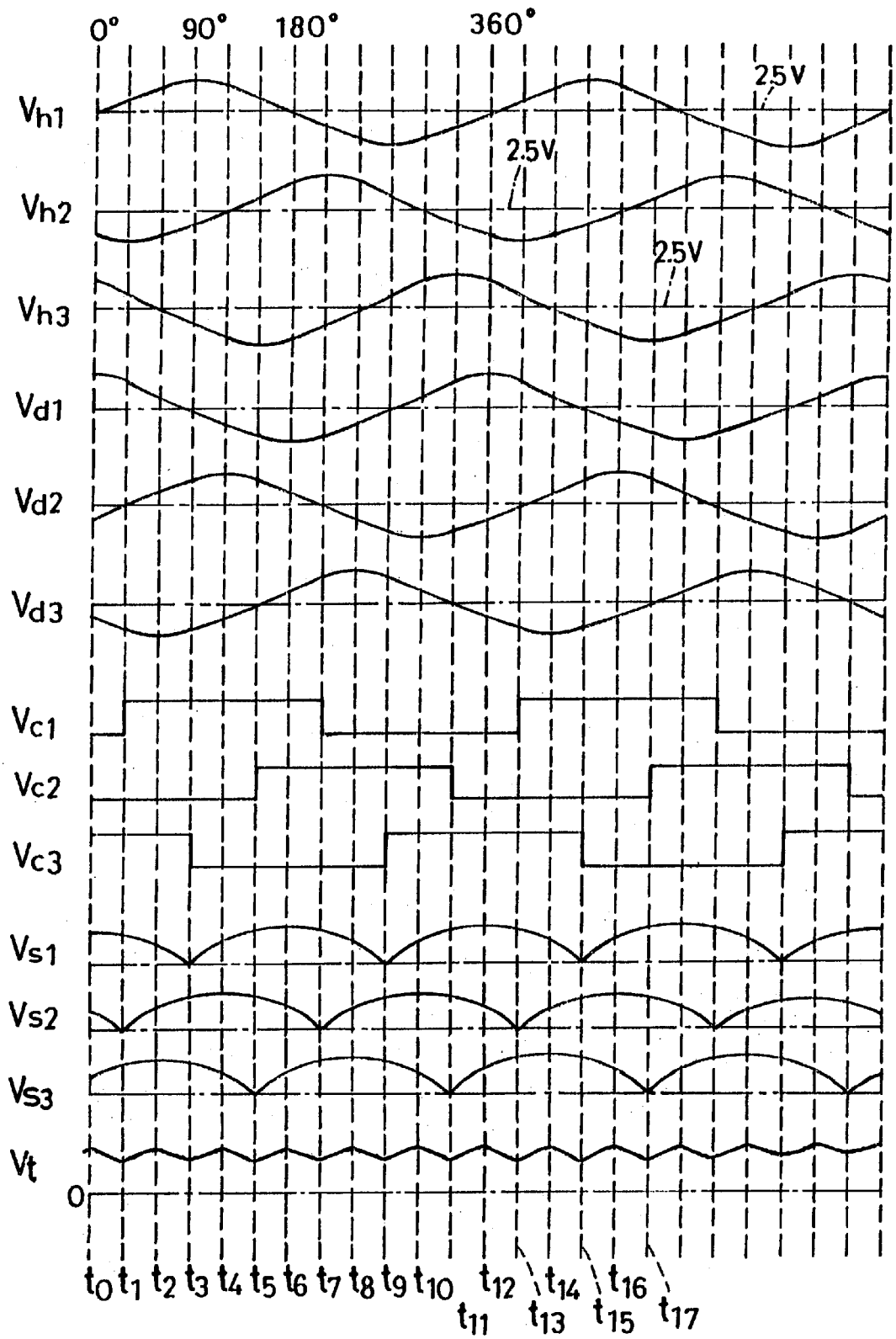
FIG. 13 is a diagram of waveforms useful in explaining the operation of the FIG. 12 speed detector circuit.

FIG. 13 shows the waveforms appearing in various parts of the FIG. 12 motor speed detector circuit 6b. Inputting the amplified rotor position signals $Vh_1$, $Vh_2$ and $Vh_3$, the binary signal forming circuits 44a, 44b and 44c put out the binary switch control signals $Vc_1$, $Vc_2$ and $Vc_3$ just like its FIG. 7 counterparts with the same reference characters. The first set of switches 41, 42 and 43 will be closed when the switch control signals $Vc_1$, $Vc_2$ and $Vc_3$ are high, and open when these signals are low. The second set of switches 51, 52 and 53 will be open when the switch control signals $Vc_1$, $Vc_2$ and $VC_3$ are high, and closed when the signals are low.

Let us assume that only the first rotor position signal $Vh_1$ is being input to the FIG. 12 motor speed detector circuit 6b. The switch 41 will be closed when the switch control signal $Vc_3$ from the third binary signal forming circuit 44c is high, as from $t_9$ to $t_{15}$ in FIG. 13, thereby passing the positive half waves of the output $Vd_1$ (similar to the output from the FIG. 7 differentiating circuit 38) from the first CR circuit 38a. The switch 51 will be closed when the third switch control signal $Vc_3$ is low, as from $T_3$ to $t_9$ to FIG. 13, thereby passing the negative half waves of the output $Vd_1$ from the first CR circuit 38a. There will thus be obtained the first motor speed signal $Vs_1$ of FIG. 13, which is equivalent to a full-wave rectification of the output $Vd_1$ from the first CR circuit 38a.

Similarly, if only the second rotor position signal $Vh_2$ is being input to the FIG. 12 speed detector circuit 6b, the switches 42 and 52 will be controlled by the switch control signal $Vc_1$ from the first binary signal forming circuit 44a. Thus the second motor speed signal $Vs_2$ will be obtained as shown in FIG. 13.

If only the third rotor position signal $Vh_3$ is being input to the FIG. 12 speed detector circuit 6b, the switches 43 and 53 will be likewise controlled by the switch control signal $Vc_2$ from the second binary signal forming circuit 44b. The third motor speed signal $Vs_3$ will then be obtained as shown in FIG. 13.

Like their FIG. 11 counterparts the first set of switches 41, 42 and 43 are all connected to one input of the first operational amplifier 57. The second set of switches 51, 52 and 53, on the other hand, are all connected to one input of the second operational amplifier 60. The output of the second operational amplifier 60 is connected to the same input of the first operational amplifier as are the first set of switches 41, 42 and 43. Thus the second operational amplifier 60 combines the rectifications of the negative half waves of the voltages $Vd_1$, $Vd_2$ and $Vd_3$. The first amplifier 57 combines the rectifications of the positive half waves of the voltages $Vd_1$, $Vd_2$ and $Vd_3$ and, further, the output from the second operational amplifier 60.

It is thus seen that when the three rotor position signals $Vh_1$, $Vh_2$ and $Vh_3$ are all being input to the FIG. 12 speed detector circuit 6b, the first operational amplifier 57 puts out the unidirectional motor speed signal Vt of FIG. 13 by adding the three motor speed signals, $Vs_1$, $Vs_2$ and $Vs_3$. The thus obtained motor speed signal Vt is notable for its low ripple percentage. It is understood that this motor speed signal Vt is directed into the differential amplifier 8, FIG. 1, thereby to be used for production of the motor speed control signal Vcon to be applied to the motor excitation circuit 2.

Sixth Form

Figure 14:
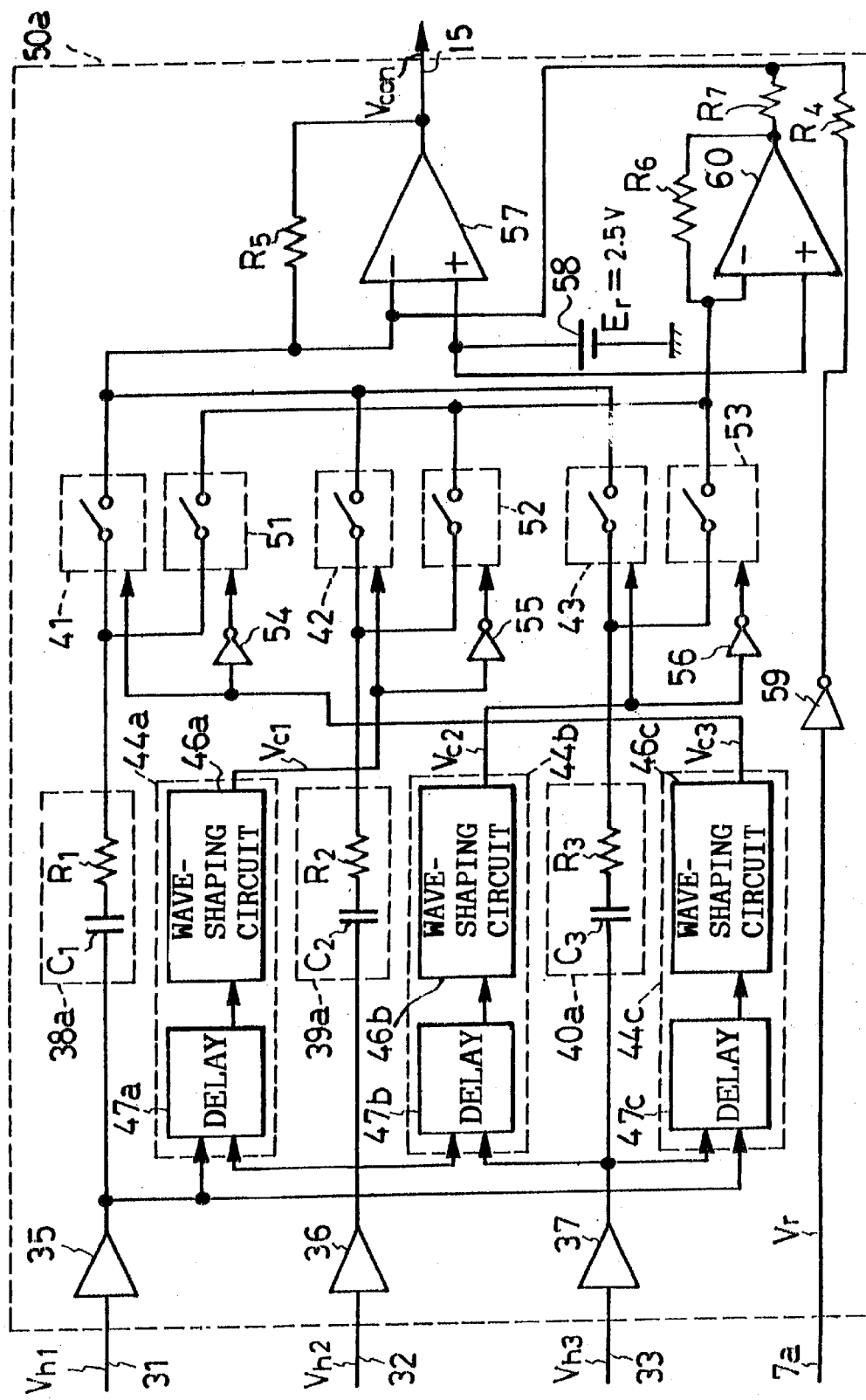
FIG. 14 is a block diagram of a further preferred embodiment of the invention, featuring a modified speed control signal forming circuit for use in the FIG. 1 speed control system in place of the FIG. 4 speed detector circuit and the differential amplifier.

The FIG. 12 speed detector circuit 6b is readily modifiable into a motor speed control circuit shown in FIG. 14 and therein generally designated 50a, by incorporating an inverter circuit 59 and a resistor $R_4$. As in the FIG. 11 speed control circuit 50, the target speed signal Vr on the input line 7a is directed into the first operational amplifier 57 via the inverter circuit 59 and resistor $R_4$. The motor speed control circuit 50a is similar to the FIG. 12 speed detector circuit 6b in the other details of construction.

The first operational amplifier 57 functions not only as differentiator and adder but as differential amplifier for production of the motor speed control signal Vcon. That is because the target speed signal Vr on the input line 7a is inverted in polarity before being fed into the first operational amplifier 57 via the resistor $R_4$. A current will flow through the feedback resistor $R_5$ of the first operational amplifier 57 toward the inverter circuit 59 because of the negative polarity of the target speed signal. A current subtraction will thus take place at the feedback resistor $R_5$, with the result that the first operational amplifier 57 provides the speed control signal Vcon as a difference between actual motor speed signal Vt and target speed signal Vr.

Seventh Form

Figure 15:
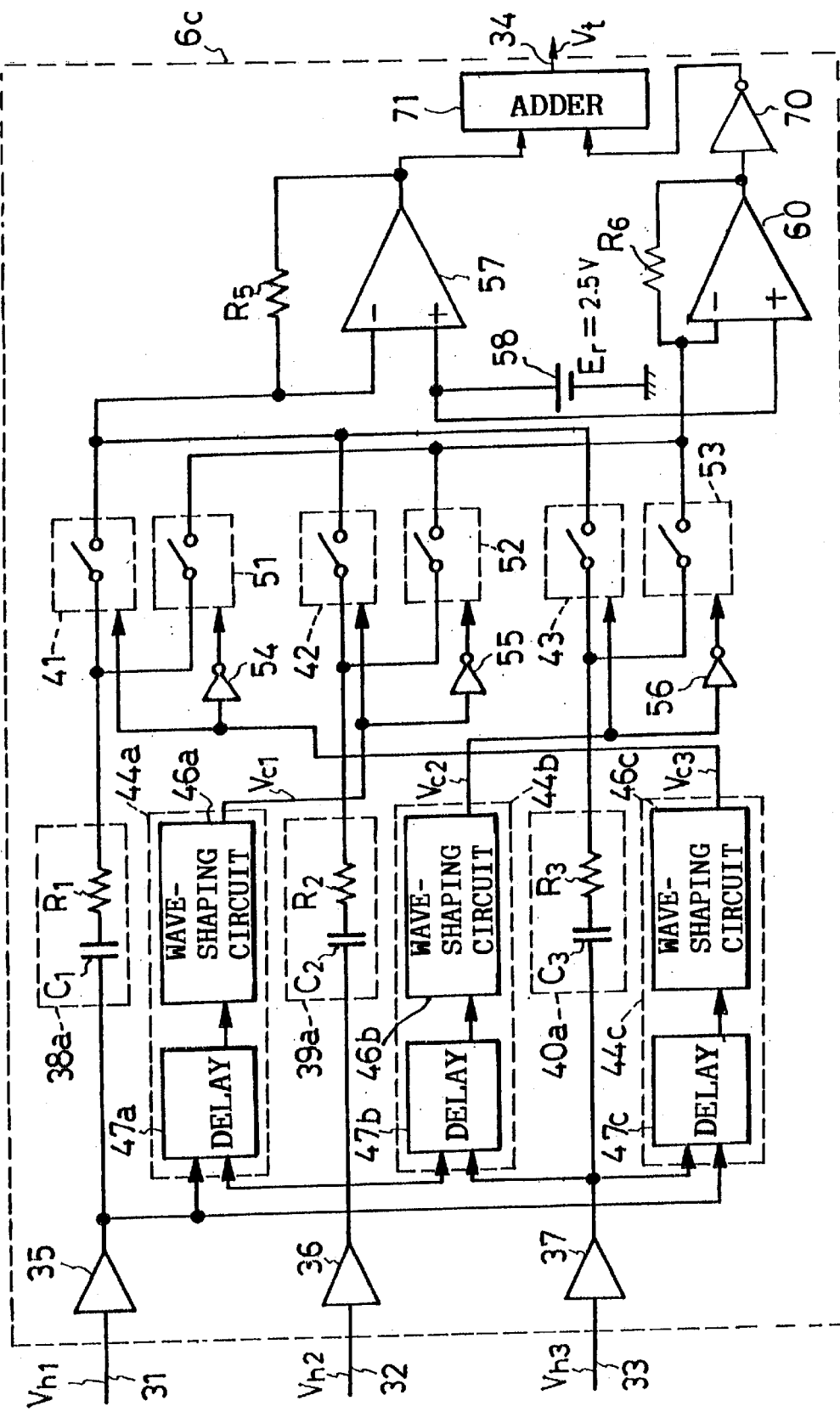
FIG. 15 is a block diagram of a further yet preferred embodiment of the invention, featuring still another modified speed detector circuit for use in the FIG. 1 speed control system in place of the FIG. 4 speed detector circuit.

In FIG. 15 is shown a modification 6c of the FIG. 12 speed detector circuit 6b. Instead of being connected to one of the inputs of the first operational amplifier 57 as in the FIG. 12 circuit 6b, the output of the second operational amplifier 60 of this modified circuit 6c is connected via an inverter circuit 70 to an adder 71, to which is also connected the output of the first operational amplifier 57. The other details of construction are as set forth above in connection with FIG. 12.

The output from the first operational amplifier 57 and the inversion of the output from the second operational amplifier 60 are added together by the adder 71 to provide the motor speed signal Vt for delivery to the differential amplifier 8, FIG. 1, over the line 34. The thus obtained motor speed signal Vt is similar to that produced by the FIG. 12 circuit 6b.

Eighth Form

Figure 16:
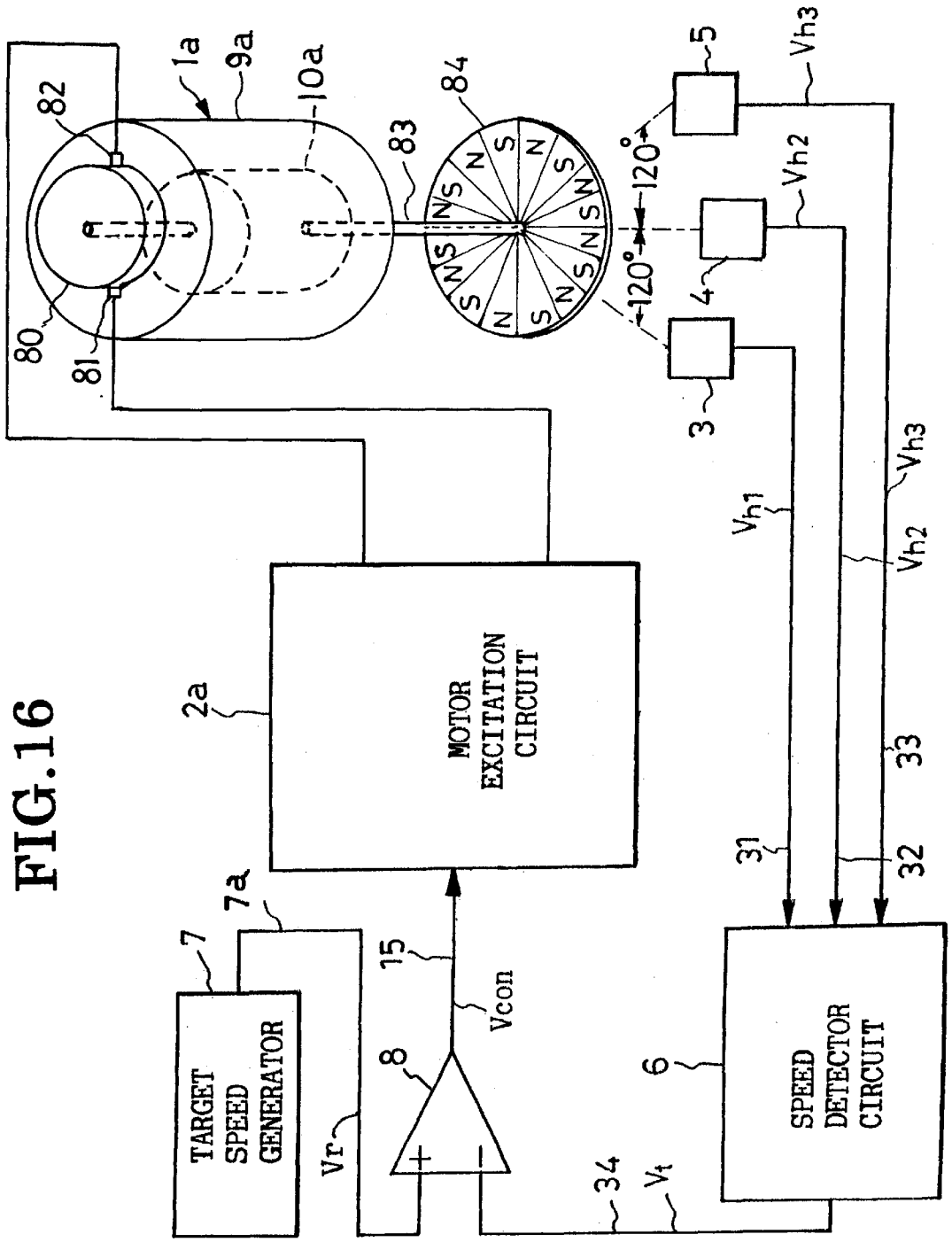
FIG. 16 is a block diagram of another preferred form of speed control system for a d.c. motor according to the present invention.
Figure 17:
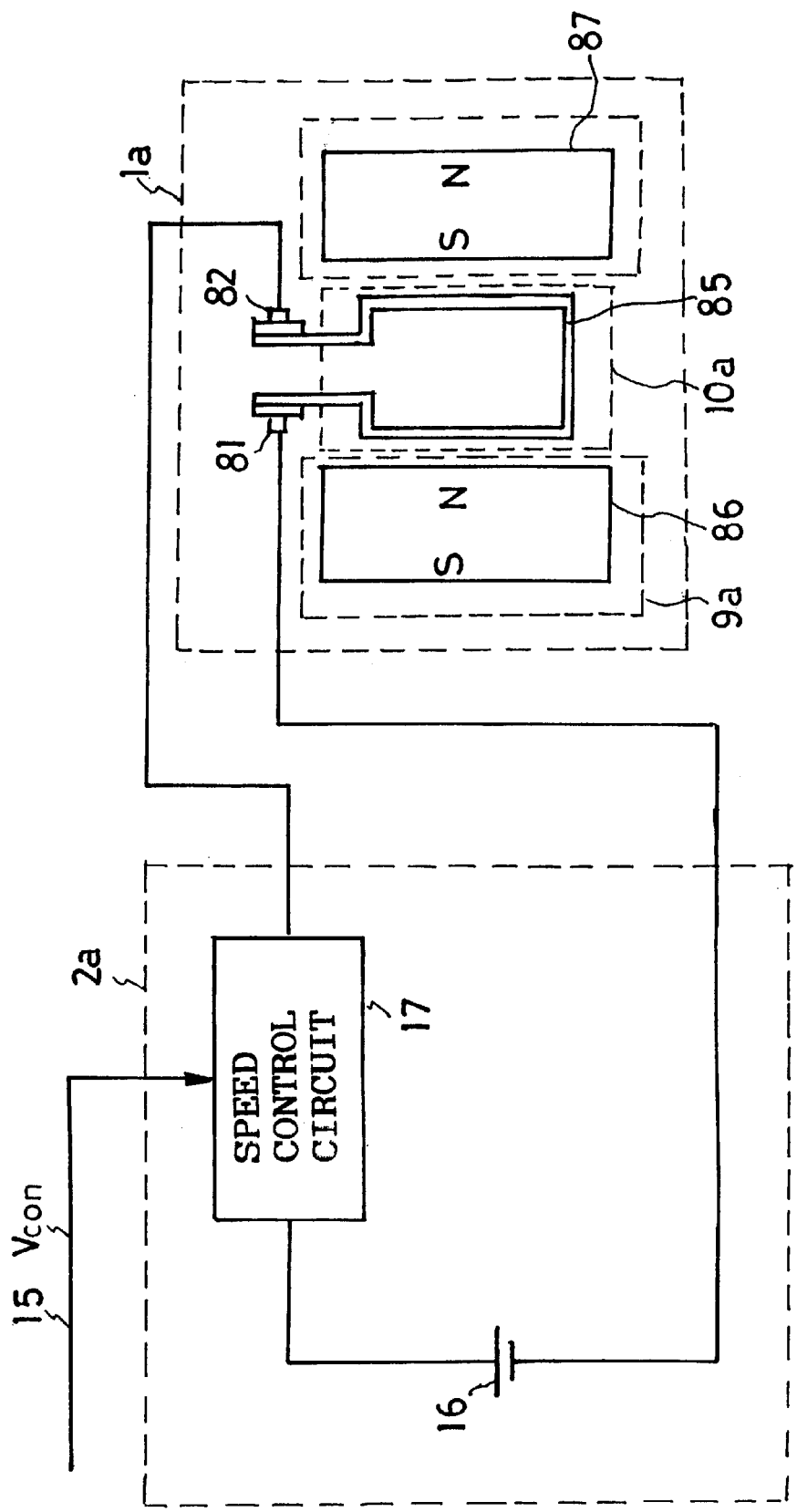
FIG. 17 is a schematic electrical diagram, partly in block form, of the motor excitation circuit of the FIG. 16 motor control system, shown together with the motor.

The present invention is applicable to the speed control of motors with brushes. In FIG. 16 is shown a modification of the FIG. 1 speed control system. The modified speed control system for a d.c. motor 1a with a pair of brushes 81 and 82 has a disk magnet 84. The d.c. motor 1a comprises a stator 9a, a rotor 10a, a brush assembly 80 with the brushes 81 and 82, and a shaft 83. As illustrated in FIG. 17, the stator 9a comprises a pair of magnets 86 and 87. The rotor 10a comprises a winding 85 and a core (not shown). The winding 85 is connected to a motor excitation circuit 2a. The motor excitation circuit 2a comprises a d.c. power supply 16 and a speed control circuit 17. The d.c. power supply 16 and the speed control circuit 17 in FIG. 17 have composition which is same as FIG. 3 counterparts 16 and 17. The speed control circuit 17 functions to control the power fed from the power supply 16 to the winding 85.

The shaft 83 of the rotor 10a is combined in the center of the disk magnet 84. Therefore, the disk magnet 84 rotates in accordance with the rotor 10a. The disk magnet 84 is divided into eight north and eight south seeking magnetic pole sections N and S alternating in its circumferential direction. The three magnetoelectric converts 3, 4 and 5, the speed detector circuit 6, the target speed signal generator 7, and the differential amplifier 8 in FIG. 16 have the composition which is the same as FIG. 1 counterparts 3–8.

The first second and third magnetoelectric converters 3, 4 and 5, are furnished on the stator 9a and are so arranged as to detect magnetic fluxes due to the magnet 84. The electrical angles between the magnetoelectric converters 3–5 in FIG. 16 disposed along the disk magnet 8 are 120 degrees. Also, the relationship between the disk magnet 84 and the magnetoelectric converts 3–5 in FIG. 16 correspond with the relationship between the rotor 10 with the magnetic pole sections N and S and the magneto electric converter 3–5 in FIG. 2. Therefore, with the rotation of the rotor 10a and the disk magnet 84 relative to the stator 9, the first to third magnetoelectric converts 3–5 will provide first to third rotor position signals $Vh_1$, $Vh_2$ and $Vh_3$, respectively, in the form of alternating voltages of sinusoidal waveform with a phase lag of 120 degrees from one to the next (FIG. 5).

The teachings of FIG. 16 using the disk magnet 84 are applicable not only to the FIG. 1 embodiment but to the FIGS. 6, 7, 11, 12, 14 and 15 embodiments as well.

Possible Modifications

Although the motor speed control system according to the present invention has been shown and described in several preferable forms, it is not desired that the invention be limited by the exact showing of the drawings or the description thereof. The following, then, is a brief list of possible modifications or alterations of the illustrated embodiments:

1. The teachings of FIG. 6, using but two magnetoelectric converters for providing three rotor position signals $Vh_1$, $Vh_2$ and $Vh_3$, are applicable not only in the FIG. 1 embodiment but to the FIGS. 7, 11, 12, 14 and 15 embodiments as well.
2. Contrary to the showing of the waveform diagrams of FIGS. 5, 10 and 13, the motor speed signals $Vs_1$, $Vs_2$ and $Vs_3$ could be of negative polarity.
3. Also with respect to the waveform diagrams of FIGS. 5, 10 and 13, the negative half waves of the outputs $Vd_1$, $Vd_2$ and $Vd_3$ from the differentiating circuits could be extracted by the switches 41, 42 and 43 of the pertinent embodiments.
4. The delay circuits 47a, 47b and 47c of the FIGS. 11, 12, 14 and 15 embodiments could be omitted, and the wave-shaping circuit 46a, 46b and 46c could be connected directly to the amplifiers 35, 36 and 37.
5. The input line 7, the inverter circuit 59 and the resistor $R_4$ of the FIG. 11 embodiment could be omitted, and the output of the operational amplifier 57 could be connected to the differential amplifier 8 of the FIG. 1.
6. The invention is applicable to d.c. motors with brushes, and alternating current motors.

These and other changes within the usual knowledge of the specialists are intended in the foregoing disclosure. It is therefore appropriate that the invention be construed broadly and in a manner consistent with the fair meaning or proper scope of the claims which follow.

What is claimed is:

1. A speed control system for a brushless d.c. motor of the type having a stator with three-phase stator windings, a rotor rotatable relative to the stator, and magnetoelectric converter means for providing a first, a second and a third rotor position signal with phase differences of 120 degrees therebetween, each rotor position signal being indicative of the angular position of the rotor relative to the stator, the motor speed control system comprising:

(a) differentiating circuit means for differentiating the first, the second and the third rotor position signal from the magnetoelectric converter means and providing a first, a second and a third output signal in a prescribed phase relationship with the first, the second and the third rotor position signal, respectively;

(b) binary signal forming circuit means for translating the first, the second and the third rotor position signal into a first, a second and a third binary signal having a prescribed phase relationship with the first, the second and the third rotor position signal, respectively, each binary signal having a first and a second prescribed state;

(c) a first switch connected to the differentiating circuit means and the binary signal forming circuit means for passing the first output from the differentiating circuit means when the third binary signal is in the first prescribed state;

(d) a second switch connected to the differentiating circuit means and the binary signal forming circuit means for passing the second output from the differentiating circuit means when the first binary signal is in the first prescribed state;

(e) a third switch connected to the differentiating circuit means and the binary signal forming circuit means for passing the third output from the differentiating circuit means when the second binary signal is in the first prescribed state;

(f) adder means connected to the first, the second and the third switch for adding outputs therefrom and thereby providing a motor speed signal representative of an actual speed of rotation of the motor;

(g) a target speed signal generator for generating a target speed signal representative of a desired speed of rotation of the motor;

(h) arithmetic means connected to the adder means and the target speed signal generator for providing a speed control signal representative of a difference between the motor speed signal and the target speed signal; and (i) a motor excitation circuit responsive both to the first, the second and the third rotor position signal from the magnetoelectric converter means and to the speed control signal from the arithmetic means for causing the motor to rotate at the desired speed.

2. The motor speed control system of claim 1 wherein the differentiating circuit means comprises a first, a second and a third differentiating circuit for differentiating the first, the second and the third rotor position signal, respectively, and providing the first, the second and the third output signal which are 90 degrees in phase advance with respect to the first, the second and the third rotor position signal.

3. The motor speed control system of claim 1 wherein the binary signal forming circuit means are adapted to produce the first, the second and the third binary signal in synchronism with the first, the second and the third rotor position signal, respectively.

4. The motor speed control system of claim 3 wherein the binary signal forming circuit comprises a first, a second and a third wave-shaping circuit capable of shaping prescribed half waves of the first, the second and the third rotor position signal into a first, a second and a third rectangular wave train for use as the first, the second and the third binary signal.

5. The motor speed control system of claim 1 wherein the binary signal forming circuit means are adapted to produce the first, the second and the third binary signal which are 30 degrees in phase lag with respect to the first, the second and the third rotor position signal, respectively.

6. The motor speed control system of claim 5 wherein the binary signal forming circuit means comprises:

(a) a first, a second and a third delay circuit for imparting a 30-degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

7. The motor speed control system of claim 6 wherein the first delay circuit comprises resistor means for combining the first and the second rotor position signal at a rate of two to one into the first delayed rotor position signal, wherein the second delay circuit comprises resistor means for combining the second and the third rotor position signal at a rate of two to one into the second delayed rotor position signal, and wherein the third delay circuit comprises resistor means for combining the third and the first rotor position signal at a rate of two to one into the third delayed rotor position signal.

8. A speed control system for a brushless d.c. motor of the type having a stator with three-phase stator windings, a rotor rotatable relative to the stator, and magnetoelectric converter means for providing a first, a second and a third rotor position signal on a first, a second and a third rotor position signal path, respectively, the rotor position signals having phase differences of 120 degrees and each being indicative of the angular position of the rotor relative to the stator, the motor speed control system comprising:

(a) a first, a second and a third capacitor to be connected respectively to the first, the second and the third rotor position signal path;

(b) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;

(c) an operational amplifier for putting out a motor speed signal indicative of an actual speed of rotation of the motor;

(d) a feedback resistor connected between an output and a first input of the operational amplifier;

(e) a source of a reference voltage connected to a second input of the operational amplifier;

(f) a first switch connected between the first capacitor and the first input of the operational amplifier and adapted to be closed by the third binary signal when the latter is in the first prescribed state;

(g) a second switch connected between the second capacitor and the first input of the operational amplifier and adapted to be closed by the first binary signal when the latter is in the first prescribed state;

(h) a third switch connected between the third capacitor and the first input of the operational amplifier and adapted to be closed by the second binary signal when the latter is in the first prescribed state;

(i) a fourth switch connected between the first capacitor and the reference voltage source and adapted to be closed by the third binary signal when the latter is in the second prescribed state;

(j) a fifth switch connected between the second capacitor and the reference voltage source and adapted to be closed by the first binary signal when the latter is in the second prescribed state;

(k) a sixth switch connected between the third capacitor and the reference voltage source and adapted to be closed by the second binary signal when the latter is in the second prescribed state;

(l) a target speed signal generator for generating a target speed signal representative of a desired speed of rotation of the motor;

(m) arithmetic means connected to the operational amplifier and the target speed signal generator for providing a speed control signal representative of a difference between the motor speed signal and the target speed signal; and (n) a motor excitation circuit responsive both to the first, the second and the third rotor position signal from the magnetoelectric converter means and to the speed control signal from the arithmetic means for causing the motor to rotate at the desired speed.

9. The motor speed control system of claim 8 wherein the first, the second and the third binary signal forming circuit are adapted to produce the first, the second and the third binary signal in synchronism with the first, the second and the third rotor position signal, respectively.

10. The motor speed control system of claim 9 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal.

11. The motor speed control system of claim 8 wherein the first, the second and the third binary signal forming circuit are adapted to produce the first, the second and the third binary signal which are 30 degrees in phase lag with respect to the first, the second and the third rotor position signal, respectively.

12. The motor speed control system of claim 11 wherein the binary signal forming circuit comprises:

(a) a first, a second and a third delay circuit for imparting a 30-degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

13. A speed control system for a brushless d.c. motor of the type having a stator with three-phase stator windings, a rotor rotatable relative to the stator, and magnetoelectric converter means for providing a first, a second and a third rotor position signal on a first, a second and a third rotor position signal path, respectively, the rotor position signals having phase differences of 120 degrees and each being indicative of the angular position of the rotor relative to the stator, the motor speed control system comprising:

(a) a first, a second and a third capacitor to be connected respectively to the first, the second and the third rotor position signal path;

(b) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;

(c) an operational amplifier for putting out a speed control signal indicative of a difference between an actual and a desired speed of rotation of the motor;

(d) a feedback resistor connected between an output and a first input of the operational amplifier;

(e) a source of a reference voltage connected to a second input of the operational amplifier;

(f) a first switch connected between the first capacitor and the first input of the operational amplifier and adapted to be closed by the third binary signal when the latter is in the first prescribed state;

(g) a second switch connected between the second capacitor and the first input of the operational amplifier and adapted to be closed by the first binary signal when the latter is in the first prescribed state;

(h) a third switch connected between the third capacitor and the first input of the operational amplifier and adapted to be closed by the second binary signal when the latter is in the first prescribed state;

(i) a fourth switch connected between the first capacitor and the reference voltage source and adapted to be closed by the third binary signal when the latter is in the second prescribed state;

(j) a fifth switch connected between the second capacitor and the reference voltage source and adapted to be closed by the first binary signal when the latter is in the second prescribed state;

(k) a sixth switch connected between the third capacitor and the reference voltage source and adapted to be closed by the second binary signal when the latter is in the second prescribed state;

(l) a target speed signal generator for generating a target speed signal representative of a desired speed of rotation of the motor;

(m) inverter means connected between the target speed signal generator and the first input of the operational amplifier for enabling the latter to produce the speed control signal; and (n) a motor excitation circuit responsive both to the first, the second and the third rotor position signal from the magnetoelectric converter means and to the speed control signal from the operational amplifier for causing the motor to rotate at the desired speed.

14. The motor speed control system of claim 13 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal, respectively.

15. The motor speed control system of claim 14 wherein the binary signal forming circuit comprises:

(a) a first, a second and a third delay circuit for imparting a 30-degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

16. The speed control system for a brushless d.c. motor of the type having a stator with three-phase stator windings, a rotor rotatable relative to the stator, and magnetoelectric converter means for providing a first, a second and a third rotor position signal on a first, a second and a third rotor position signal path, respectively, the rotor position signals having phase differences of 120 degrees and each being indicative of the angular position of the rotor relative to the stator, the motor speed control system comprising:

(a) a first, a second and a third capacitor to be connected respectively to the first, the second and the third rotor position signal path;

(b) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;

(c) a first operational amplifier for putting out a motor speed signal indicative of an actual speed of rotation of the motor;

(d) a first feedback resistor connected between an output and a first input of the first operational amplifier;

(e) a second operational amplifier;

(f) a second feedback resistor connected between an output and a first input of the second operational amplifier;

(g) means connecting the output of the second operational amplifier to the first input of the first operational amplifier;

(h) a source of a reference voltage connected to a second input of the first operational amplifier and to a second input of the second operational amplifier;

(i) a first switch connected between the first capacitor and the first input of the first operational amplifier and adapted to be closed by the third binary signal when the latter is in the first prescribed state;

(j) a second switch connected between the second capacitor and the first input of the first operational amplifier and adapted to be closed by the first binary signal when the latter is in the first prescribed state;

(k) a third switch connected between the third capacitor and the first input of the first operational amplifier and adapted to be closed by the second binary signal when the latter is in the first prescribed state;

(l) a fourth switch connected between the first capacitor and the first input of the second operational amplifier and adapted to be closed by the third binary signal when the latter is in the second prescribed state;

(m) a fifth switch connected between the second capacitor and the first input of the second operational amplifier and adapted to be closed by the first binary signal when the latter is in the second prescribed state;

(n) a sixth switch connected between the third capacitor and the first input of the second operational amplifier and adapted to be closed by the second binary signal when the latter is in the second prescribed state;

(o) a target speed signal generator for generating a target speed signal representative of a desired speed of rotation of the motor;

(p) arithmetic means connected to the first operational amplifier and the target speed signal generator for providing a speed control signal representative of a difference between the motor speed signal and the target speed signal; and (q) a motor excitation circuit responsive both to the first, the second and the third rotor position signal from the magnetoelectric converter means and to the speed control signal from the arithmetic means for causing the motor to rotate at the desired speed.

17. The motor speed control system of claim 16 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal, respectively.

18. The motor speed control system of claim 16 wherein the binary signal forming circuit comprises:

(a) a first, a second and a third delay circuit for imparting a 30-degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

19. A speed control system for a brushless d.c. motor of the type having a stator with three-phase stator windings, a rotor rotatable relative to the stator, and magnetoelectric converter means for providing a first, a second and a third rotor position signal on a first, a second and a third rotor position signal path, respectively, the rotor position signals having phase differences of 120 degrees and each being indicative of the angular position of the rotor relative to the stator, the motor speed control system comprising:

(a) a first, a second and a third capacitor to be connected respectively to the first, the second and the third rotor position signal path;

(b) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;

(c) a first operational amplifier for putting out a speed control signal indicative of a difference between an actual and a desired speed of rotation of the motor;

(d) a first feedback resistor connected between an output and a first input of the first operational amplifier;

(e) a second operational amplifier;

(f) a second feedback resistor connected between an output and a first input of the second operational amplifier;

(g) means connecting the output of the second operational amplifier to the first input of the first operational amplifier;

(h) a source of a reference voltage connected to a second input of the first operational amplifier and to a second input of the second operational amplifier;

(i) a first switch connected between the first capacitor and the first input of the first operational amplifier and adapted to be closed by the third binary signal when the latter is in the first prescribed state;

(j) a second switch connected between the second capacitor and the first input of the first operational amplifier and adapted to be closed by the first binary signal when the latter is in the first prescribed state;

(k) a third switch connected between the third capacitor and the first input of the first operational amplifier and adapted to be closed by the second binary signal when the latter is in the first prescribed state;

(l) a fourth switch connected between the first capacitor and the first input of the second operational amplifier and adapted to be closed by the third binary signal when the latter is in the second prescribed state;

(m) a fifth switch connected between the second capacitor and the first input of the second operational amplifier and adapted to be closed by the first binary signal when the latter is in the second prescribed state;

(n) a sixth switch connected between the third capacitor and the first input of the second operational amplifier and adapted to be closed by the second binary signal when the latter is in the second prescribed state;

(o) a target speed signal generator for generating a target speed signal representative of a desired speed of rotation of the motor;

(p) inverter means connected between the target speed signal generator and the first input of the first operational amplifier for enabling the latter to produce the speed control signal; and (q) a motor excitation circuit responsive both to the first, the second and the third rotor position signal from the magnetoelectric converter means and to the speed control signal from the first operational amplifier for causing the motor to rotate at the desired speed.

20. The motor speed control system of claim 19 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal, respectively.

21. The motor speed control system of claim 19 wherein the binary signal forming circuit comprises:

(a) a first, a second and a third delay circuit for imparting a 30-degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

22. A speed control system for a brushless d.c. motor of the type having a stator with three-phase stator windings, a rotor rotatable relative to the stator, and magnetoelectric converter means for providing a first, a second and a third rotor position signal on a first, a second and a third rotor position signal path, respectively, the rotor position signals having phase differences of 120 degrees and each being indicative of the angular position of the rotor relative to the stator, the motor speed control system comprising:
(a) a first, a second and a third capacitor to be connected respectively to the first, the second and the third rotor position signal path;
(b) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;
(c) a first and a second operational amplifier;
(d) a first feedback resistor connected between an output and a first input of the first operational amplifier;
(e) a second feedback resistor connected between an output and a first input of the second operational amplifier;
(f) a source of a reference voltage connected to a second input of the first operational amplifier and to a second input of the second operational amplifier;
(g) a first switch connected between the first capacitor and the first input of the first operational amplifier and adapted to be closed by the third binary signal when the latter is in the first prescribed state;
(h) a second switch connected between the second capacitor and the first input of the first operational amplifier and adapted to be closed by the first binary signal when the latter is in the first prescribed state;
(i) a third switch connected between the third capacitor and the first input of the first operational amplifier and adapted to be closed by the second binary signal when the latter is in the first prescribed state;
(j) a fourth switch connected between the first capacitor and the first input of the second operational amplifier and adapted to be closed by the third binary signal when the latter is in the second prescribed state;
(k) a fifth switch connected between the second capacitor and the first input of the second operational amplifier and adapted to be closed by the first binary signal when the latter is in the second prescribed state;
(l) a sixth switch connected between the third capacitor and the first input of the second operational amplifier and adapted to be closed by the second binary signal when the latter is in the second prescribed state;
(m) an inverter circuit connected to the output of the second operational amplifier;
(n) an adder for providing a motor speed signal representative of an actual speed of rotation of the motor by combining outputs from the first operational amplifier and the inverter circuit;
(o) a target speed signal generator for generating a target speed signal representative of a desired speed of rotation of the motor;
(p) arithmetic means connected to the adder and the target speed signal generator for providing a speed control signal representative of a difference between the motor speed signal and the target speed signal; and
(q) a motor excitation circuit responsive both to the first, the second and the third rotor position signal from the magnetoelectric converter means and to the speed control signal from the arithmetic means for causing the motor to rotate at the desired speed.

23. The motor speed control system of claim 22 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal, respectively.

24. The motor speed control system of claim 22 wherein the binary signal forming circuit comprises:
(a) a first, a second and a third delay circuit for imparting a 30-degree phase delay to the first, the second and the third rotor position signal, respectively; and
(b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

25. A speed control system for a motor of the type having a stator and a rotor rotatable relative to the stator, the motor speed control system comprising:
(a) a magnet coupled to the rotor and having a plurality of north magnetic pole sections and a plurality of south magnetic pole sections alternating in its circumferential direction;
(b) magnetoelectric converter means having a plurality of magnetoelectric converters disposed along the magnet for providing a first, a second and a third rotor position signal with phase differences of 120 degrees therebetween, each rotor position signal being indicative of the angular position of the rotor relative to the stator;
(c) differentiating circuit means for differentiating the first, the second and the third rotor position signal from the magnetoelectric converter means and providing a first, a second and a third output signal in a prescribed phase relationship with the first, the second and the third rotor position signal, respectively;
(d) binary signal forming circuit means for translating the first, the second and the third rotor position signal into a first, a second and a third binary signal having a prescribed phase relationship with the first, the second and the third rotor position signal, respectively, each binary signal having a first and a second prescribed state;
(e) a first switch connected to the differentiating circuit means and the binary signal forming circuit means for passing the first output from the differentiating circuit means when the third binary signal is in the first prescribed state;
(f) a second switch connected to the differentiating circuit means and the binary signal forming circuit means for passing the second output form the differentiating circuit means when the first binary signal is in the first prescribed state;
(g) a third switch connected to the differentiating circuit means and the binary signal forming circuit means for passing the third output form the differentiating circuit means when the second binary signal is in the first prescribed state;
(h) adder means connected to the first, the second and the third switch for adding outputs therefrom and thereby providing a motor speed signal representative of an actual speed of rotation of the motor;

(i) a target speed signal generator for generating a target speed signal representative of a desired speed of rotation of the motor;

(j) arithmetic means connected to the adder means and the target speed signal generator for providing a speed control signal representative of a difference between the motor speed signal and the target speed signal; and (k) a motor excitation circuit responsive both to the first, the second and the third rotor position signal from the magnetoelectric converter means and to the speed control signal from the arithmetic means for causing the motor to rotate at the desired speed.

26. The motor speed control system of claim 25 wherein the magnetoelectric converter means comprises a first, a second and a third magnetoelectric converter disposed along the magnet for providing the first, the second and the third rotor position signal with phase differences of 120 degrees therebetween.

27. The motor speed control system of claim 25 wherein the magnetoelectric converter means comprises a first and a second magnetoelectric converter disposed along the magnet for providing the a first and the second rotor position signal with phase differences of 120 degrees therebetween, and a third rotor position signal forming circuit connected to the first and the second magnetoelectric converters for creating the third rotor position signal from the first and the second rotor position signals.

28. The motor speed control system of claim 25 wherein the differentiating circuit means comprises a first, a second and a third differentiating circuit for differentiating the first, the second and the third rotor position signal, respectively, and providing the first, the second and the third output signal which are 90 degrees in phase advance with respect to the first, the second and the third rotor position signal.

29. The motor speed control system of claim 25 wherein the binary signal forming circuit means are adapted to produce the first, the second and the third binary signal in synchronism with the first, the second and the third rotor position signal, respectively.

30. The motor speed control system of claim 29 wherein the binary signal forming circuit comprises a first, a second and a third wave-shaping circuit capable of shaping prescribed half waves of the first, the second and the third rotor position signal into a first, a second and a third rectangular wave train for use as the first, the second and the third binary signal.

31. The motor speed control system of claim 25 wherein the binary signal forming circuit means are adapted to produce the first, the second and the third binary signal which are 30 degrees in phase lag with respect to the first, the second and the third rotor position signal, respectively.

32. The motor speed control system of claim 31 wherein the binary signal forming circuit means comprises:

(a) a first, a second and a third delay circuit for imparting a 30 degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

33. The motor speed control system of claim 32 wherein the first delay circuit comprises resistor means for combining the first and the second rotor position signal at a rate of two to one into the first delayed rotor position signal, wherein the second delay circuit comprises resistor means for combining the second and the third rotor position signal at a rate of two to one into the second delayed rotor position signal, and wherein the third delay circuit comprises resistor means for combining the third and the first rotor position signal a rate of two to one into the third delayed rotor position signal.

34. A speed control system for a motor of the type having a stator and a rotor rotatable relative to the stator, the motor speed control system comprising:

(a) a magnet coupled to the rotor and having a plurality of north magnetic pole sections and a plurality of south magnetic pole sections alternating in its circumferential direction;

(b) magnetoelectric converter means having a plurality of magnetoelectric converters disposed along the magnet for providing a first, a second and a third rotor position signal on a first, a second and a third rotor position signal path, respectively, the rotor position signal having phase differences of 120 degrees therebetween and each being indicative of the angular position of the rotor relative to the stator;

(c) a first, a second and a third capacitor to be connected respectively to the first, the second and the third rotor position signal path;

(d) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;

(e) an operational amplifier for putting out a motor speed signal indicative of an actual speed of rotation of the motor;

(f) a feedback resistor connected between an output and a first input of the operational amplifier;

(g) a source of a reference voltage connected to a second input of the operational amplifier;

(h) a first switch connected between the first capacitor and the first input of the operational amplifier and adapted to be closed by the third binary signal when the latter is in the first prescribed state;

(i) a second switch connected between the second capacitor and the first input of the operational amplifier and adapted to be closed by the first binary signal when the latter is in the first prescribed state;

(j) a third switch connected between the third capacitor and the first input of the operational amplifier and adapted to be closed by the second binary signal when the latter is in the first prescribed state;

(k) a fourth switch connected between the first capacitor and the reference voltage source and adapted to be closed by the third binary signal when the latter is in the second prescribed state;

(l) a fifth switch connected between the second capacitor and the reference voltage source and adapted to be closed by the first binary signal when the latter is in the second prescribed state;

(m) a sixth switch connected between the third capacitor and the reference voltage source and adapted to be closed by the second binary signal when the latter is in the second prescribed state;

(n) a target speed signal generator for generating a target speed signal representative of a desired speed of rotation of the motor;

(o) arithmetic means connected to the operational amplifier and the target speed signal generator for providing a speed control signal representative of a difference between the motor speed signal and the target speed signal; and (p) a motor excitation circuit responsive to the speed control signal from the arithmetic means for causing the motor to rotate at the desired speed.

35. The motor speed control system of claim 34 wherein the magnetoelectric converter means comprises a first, a second and a third magnetoelectric converter disposed along the magnet for providing the first, the second and the third rotor position signal with phase differences of 120 degrees therebetween.

36. The motor speed control system of claim 34 wherein the magnetoelectric converter means comprises a first and a second magnetoelectric converter disposed along the magnet for providing the a first and the second rotor position signal with phase differences of 120 degrees therebetween, and a third rotor position signal forming circuit connected to the first and the second magnetoelectric converters for creating the third rotor position signal from the first and the second rotor position signals.

37. The motor speed control system of claim 34 wherein the first, the second and the third binary signal forming circuit are adapted to produce the first, the second and the third binary signal in synchronism with the first, the second and the third rotor position signal, respectively.

38. The motor speed control system of claim 37 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal.

39. The motor speed control system of claim 34 wherein the first, the second and the third binary signal forming circuit are adapted to produce the first, the second and the third binary signal which are 30 degrees in phase lag with respect to the first, the second and the third rotor position signal, respectively.

40. The motor speed control system of claim 39 wherein the binary signal forming circuit comprises:

(a) a first, a second and a third delay circuit for imparting a 30 degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

41. A speed control system for a motor of the type having a stator and a rotor rotatable relative to the stator, the motor speed control system comprising:

(a) a magnet coupled to the rotor and having a plurality of north magnetic pole sections and a plurality of south magnetic pole sections alternating in its circumferential direction;

(b) magnetoelectric converter means having a plurality of magnetoelectric converters disposed along the magnet for providing a first, a second and a third rotor position signal on a first, a second and a third rotor position signal path, respectively, the rotor position signals having phase differences of 120 degrees therebetween and each being indicative of the angular position of the rotor relative to the stator;

(c) a first, a second and a third capacitor to be connected respectively to the first, the second and the third rotor position signal path;

(d) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;

(e) an operational amplifier for putting out a motor speed signal indicative of a difference between an actual and a desired speed of rotation of the motor;

(f) a feedback resistor connected between an output and a first input of the operational amplifier;

(g) a source of a reference voltage connected to a second input of the operational amplifier;

(h) a first switch connected between the first capacitor and the first input of the operational amplifier and adapted to be closed by the third binary signal when the latter is in the first prescribed state;

(i) a second switch connected between the second capacitor and the first input of the operational amplifier and adapted to be closed by the first binary signal when the latter is in the first prescribed state;

(j) a third switch connected between the third capacitor and the first input of the operational amplifier and adapted to be closed by the second binary signal when the latter is in the first prescribed state;

(k) a fourth switch connected between the first capacitor and the reference voltage source and adapted to be closed by the third binary signal when the latter is in the second prescribed state;

(l) a fifth switch connected between the second capacitor and the reference voltage source and adapted to be closed by the first binary signal when the latter is in the second prescribed state;

(m) a sixth switch connected between the third capacitor and the reference voltage source and adapted to be closed by the second binary signal when the latter is in the second prescribed state;

(n) a target speed signal generator for generating a target speed signal representative of a desired speed of rotation of the motor;

(o) inverter means connected between the target speed signal generator and the first input of the operational amplifier for enabling the latter to produce the speed control signal; and (p) a motor excitation circuit responsive to the speed control signal from the operational amplifier for causing the motor to rotate at the desired speed.

42. The motor speed control system of claim 41 wherein the magnetoelectric converter means comprises a first, a second and a third magnetoelectric converter disposed along the magnet for providing the first, the second and the third rotor position signal with phase differences of 120 degrees therebetween.

43. The motor speed control system of claim 41 wherein the magnetoelectric converter means comprises a first and a second magnetoelectric converter disposed along the magnet for providing the a first and the second rotor position signal with phase differences of 120 degrees therebetween, and a third rotor position signal forming circuit connected to the first and the second magnetoelectric converters for creating the third rotor position signal from the first and the second rotor position signals.

44. The motor speed control system of claim 41 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal, respectively.

45. The motor speed control system of claim 44 wherein the binary signal forming circuit comprises:
   (a) a first, a second and a third delay circuit for imparting a 30 degree phase delay to the first, the second and the third rotor position signal, respectively; and
   (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

46. A speed control system for a motor of the type having a stator and a rotor rotatable relative to the stator, the motor speed control system comprising:
   (a) a magnet coupled to the rotor and having a plurality of north magnetic pole sections and a plurality of south magnetic pole sections alternating in its circumferential direction;
   (b) magnetoelectric converter means having a plurality of magnetoelectric converters disposed along the magnet for providing a first, a second and a third rotor position signal on a first, a second and a third rotor position signal path, respectively, the rotor position signals having phase differences of 120 degrees therebetween and each being indicative of the angular position of the rotor relative to the stator;
   (c) a first, a second and a third capacitor to be connected respectively to the first, the second and the third rotor position signal path;
   (d) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;
   (e) a first operational amplifier for putting out a motor speed signal indicative of an actual speed of rotation of the motor;
   (f) a feedback resistor connected between an output and a first input of the first operational amplifier;
   (g) a second operational amplifier;
   (h) a second feedback resistor connected between an output and a first input of the second operational amplifier;
   (i) means connecting the output of the second operational amplifier to the first input of the first operational amplifier;
   (j) a source of a reference voltage connected to a second input of the first operational amplifier and to a second input of the second operational amplifier;
   (k) a first switch connected between the first capacitor and the first input of the first operational amplifier and adapted to be closed by the third binary signal when the latter is in the first prescribed state;
   (l) a second switch connected between the second capacitor and the first input of the first operational amplifier and adapted to be closed by the first binary signal when the latter is in the first prescribed state;
   (m) a third switch connected between the third capacitor and the first input of the first operational amplifier and adapted to be closed by the second binary signal when the latter is in the first prescribed state;
   (n) a fourth switch connected between the first capacitor and the first input of the second operational amplifier and adapted to be closed by the third binary signal when the latter is in the second prescribed state;
   (o) a fifth switch connected between the second capacitor and the first input of the second operational amplifier and adapted to be closed by the first binary signal when the latter is in the second prescribed state;
   (p) a sixth switch connected between the third capacitor and the first input of the second operational amplifier and adapted to be closed by the second binary signal when the latter is in the second prescribed state;
   (q) a target speed signal generator for generating a target speed signal representative of a desired speed of rotation of the motor;
   (r) arithmetic means connected to the first operational amplifier and the target speed signal generator for providing a speed control signal representative of a difference between the motor speed signal and the target speed signal; and
   (s) a motor excitation circuit responsive to the speed control signal from the arithmetic means for causing the motor to rotate at the desired speed.

47. The motor speed control system of claim 46 wherein the magnetoelectric converter means comprises a first, a second and a third magnetoelectric converter disposed along the magnet for providing the first, the second and the third rotor position signal with phase difference of 120 degrees therebetween.

48. The motor speed control system of claim 46 wherein the magnetoelectric converter means comprises a first and a second magnetoelectric converter disposed along the magnet for providing the a first and the second rotor position signal with phase differences of 120 degrees therebetween, and a third rotor position signal forming circuit connected to the first and the second magnetoelectric converters for creating the third rotor position signal from the first and the second rotor position signals.

49. The motor speed control system of claim 46 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal, respectively.

50. The motor speed control system of claim 49 wherein the binary signal forming circuit comprises:
   (a) a first, a second and a third delay circuit for imparting a 30 degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

51. A speed control system for a motor of the type having a stator and a rotor rotatable relative to the stator, the motor speed control system comprising:
(a) a magnet coupled to the rotor and having a plurality of north magnetic pole sections and a plurality of south magnetic pole sections alternating in its circumferential direction;
(b) magnetoelectric converter means having a plurality of magnetoelectric converters disposed along the magnet for providing a first, a second and a third rotor position signal on a first, a second and a third rotor position signal path, respectively, the rotor position signals having phase differences of 120 degrees therebetween and each being indicative of the angular position of the rotor relative to the stator;
(c) a first, a second and a third capacitor to be connected respectively to the first, the second and the third rotor position signal path;
(d) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;
(e) a first operational amplifier for putting out a motor speed signal indicative of a difference between an actual and a desired speed of rotation of the motor;
(f) a first feedback resistor connected between an output and a first input of the first operational amplifier;
(g) a second operational amplifier;
(h) a second feedback resistor connected between an output and a first input of the second operational amplifier;
(i) means connecting the output of the second operational amplifier to the first input of the first operational amplifier;
(j) a source of a reference voltage connected to a second input of the first operational amplifier and to a second input of the second operational amplifier;
(k) a first switch connected between the first capacitor and the first input of the first operational amplifier and adapted to be closed by the third binary signal when the latter is in the first prescribed state;
(l) a second switch connected between the second capacitor and the first input of the first operational amplifier and adapted to be closed by the first binary signal when the latter is in the first prescribed state;
(m) a third switch connected between the third capacitor and the first input of the first operational amplifier and adapted to be closed by the second binary signal when the latter is in the first prescribed state;
(n) a fourth switch connected between the first capacitor and the first input of the second operational amplifier and adapted to be closed by the third binary signal when the latter is in the second prescribed state;
(o) a fifth switch connected between the second capacitor and the first input of the second operational amplifier and adapted to be closed by the first binary signal when the latter is in the second prescribed state;
(p) a sixth switch connected between the third capacitor and the first input of the second operational amplifier and adapted to be closed by the second binary signal when the latter is in the second prescribed state;
(q) a target speed signal generator for generating a target speed signal representative of a desired speed of rotation of the motor;
(r) inverter means connected between the target speed signal generator and the first input of the first operational amplifier for enabling the latter to produce the speed control signal; and
(s) a motor excitation circuit responsive to the speed control signal from the first operational amplifier for causing the motor to rotate at the desired speed.

52. The motor speed control system of claim 51 wherein the magnetoelectric converter means comprises a first, a second and a third magnetoelectric converter disposed along the magnet for providing the first, the second and the third rotor position signal with phase differences of 120 degrees therebetween.

53. The motor speed control system of claim 51 wherein the magnetoelectric converter means comprises a first and a second magnetoelectric converter disposed along the magnet for providing the a first and a second rotor position signal with phase differences of 120 degrees therebetween, and a third rotor position signal forming circuit connected to the first and the second magnetoelectric converters for creating the third rotor position signal from the first and the second rotor position signals.

54. The motor speed control system of claim 51 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal.

55. The motor speed control system of claim 54 wherein the binary signal forming circuit comprises:
(a) a first, a second and a third delay circuit for imparting a 30 degree phase delay to the first, the second and the third rotor position signal, respectively; and
(b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

56. A speed control system for a motor of the type having a stator and a rotor rotatable relative to the stator, the motor speed control system comprising:
(a) a magnet coupled to the rotor and having a plurality of north magnetic pole sections and a plurality of south magnetic pole sections alternating in its circumferential direction;
(b) magnetoelectric converter means having a plurality of magnetoelectric converters disposed along the magnet for providing a first, a second and a third rotor position signal on a first, a second and a third rotor position signal path, respectively, the rotor position signals having phase differences of 120 degrees therebetween and each being indicative of the angular position of the rotor relative to the stator;

(c) a first, a second and a third capacitor to be connected respectively to the first, the second and the third rotor position signal path;

(d) a first, a second and a third binary signal forming circuit to be connected respectively to the first, the second and the third rotor position signal path for translating the first, the second and the third rotor position signal into a first, a second and a third binary signal having a prescribed phase relationship with the first, the second and the third rotor position signal, respectively, each binary signal having a first and a second prescribed state;

(e) a first and a second operational amplifier;

(f) a first feedback resistor connected between an output and a first input of the first operational amplifier;

(g) a second feedback resistor connected between an output and a first input of the second operational amplifier;

(h) a source of a reference voltage connected to a second input of the first operational amplifier and to a second input of the second operational amplifier;

(i) a first switch connected between the first capacitor and the first input of the first operational amplifier and adapted to be closed by the third binary signal when the latter is in the first prescribed state;

(j) a second switch connected between the second capacitor and the first input of the first operational amplifier and adapted to be closed by the first binary signal when the latter is in the first prescribed state;

(k) a third switch connected between the third capacitor and the first input of the first operational amplifier and adapted to be closed by the second binary signal when the latter is in the first prescribed state;

(l) a fourth switch connected between the first capacitor and the first input of the second operational amplifier and adapted to be closed by the third binary signal when the latter is in the second prescribed state;

(m) a fifth switch connected between the second capacitor and the first input of the second operational amplifier and adapted to be closed by the first binary signal when the latter is in the second prescribed state;

(n) a sixth switch connected between the third capacitor and the first input of the second operational amplifier and adapted to be closed by the second binary signal when the latter is in the second prescribed state;

(o) an inverter circuit connected to the output of the second operational amplifier;

(p) an adder for providing a motor speed signal representative of an actual speed of rotation of the motor by combining outputs from the first operational amplifier and the inverter circuit;

(q) a target speed signal generator for generating a target speed signal representative of a desired speed of rotation of the motor;

(r) arithmetic means connected to the adder and the target speed signal generator for providing a speed control signal representative of a difference between the motor speed signal and the target speed signal; and (s) a motor excitation circuit responsive to the speed control signal from the arithmetic means for causing the motor to rotate at the desired speed.

57. The motor speed control system of claim 56 wherein the magnetoelectric converter means comprises a first, a second and a third magnetoelectric converter disposed along the magnet for providing the first, the second and the third rotor position signal with phase differences of 120 degrees therebetween.

58. The motor speed control system of claim 56 wherein the magnetoelectric converter means comprises a first and a second magnetoelectric converter disposed along the magnet for providing the a first and the second rotor position signal with phase differences of 120 degrees therebetween, and a third rotor position signal forming circuit connected to the first and the second magnetoelectric converters for creating the third rotor position signal from the first and the second rotor position signals.

59. The motor speed control system of claim 56 wherein the first, the second and the third binary signal forming circuit comprise a first, a second and a third wave-shaping circuit capable of shaping prescribed half waves of the first, the second and the third rotor position signal into a first, a second and a third rectangular wave train for use as the first, the second and the third binary signal.

60. The motor speed control system of claim 59 wherein the binary signal forming circuit comprises:

(a) a first, a second and a third delay circuit for imparting a 30 degree phase delay to the first, the second and the third rotor position signal, respectively; and (b) a first, a second and a third wave-shaping circuit connected to the first, the second and the third delay circuit, respectively, for shaping prescribed half waves of the first, the second and the third delayed rotor position signal into a first, a second and a third rectangular wave train for use as the first, the second and the third binary signal.

* * * * *